United States Patent [19]

Jeannot et al.

[11] Patent Number: 5,224,351
[45] Date of Patent: Jul. 6, 1993

[54] AIR DISTILLATING COLUMN WITH CROSS-UNDULATING LINING

[75] Inventors: Pierre Jeannot, Rosny-sous-Bois; Jean-Yves Lehman, Maisons Alfort, both of France

[73] Assignee: L'Air Liquide, Societe Anonyme Pour l'Etude et l'Exploitation des Procedes Georges Claude, Paris, France

[21] Appl. No.: 803,638

[22] Filed: Dec. 5, 1991

[30] Foreign Application Priority Data

| Dec. 17, 1990 [FR] | France | 90 15756 |
| Feb. 18, 1991 [FR] | France | 91 01879 |
| Feb. 28, 1991 [FR] | France | 91 02393 |
| May 17, 1991 [FR] | France | 91 05999 |
| Jul. 19, 1991 [FR] | France | 91 09150 |

[51] Int. Cl.⁵ .................................. F25J 3/00
[52] U.S. Cl. ........................... 62/36; 165/166; 196/139; 202/158; 203/39; 203/DIG. 6; 261/152
[58] Field of Search ............. 196/139; 202/158; 203/39, DIG. 6; 62/36, 42, 22; 261/152; 165/166

[56] References Cited

U.S. PATENT DOCUMENTS

| 2,639,130 | 5/1953 | Heere | 261/97 |
| 2,982,527 | 5/1961 | Eld et al. | 202/158 |
| 3,099,697 | 7/1963 | Lerman et al. | 261/97 |
| 4,055,610 | 10/1977 | Leva et al. | 261/114 R |
| 4,442,048 | 4/1984 | Abernathy et al. | 202/158 |
| 4,615,770 | 10/1986 | Govind | 202/158 |
| 4,744,929 | 5/1988 | Robinson et al. | 202/158 |
| 4,872,955 | 10/1989 | Parker et al. | 202/158 |
| 5,078,766 | 1/1992 | Guilleminot | 62/36 |

FOREIGN PATENT DOCUMENTS

| 0190435 | 12/1985 | European Pat. Off. . |
| 0215413 | 9/1986 | European Pat. Off. . |
| 434510 | 6/1991 | European Pat. Off. . |
| 1080075 | 4/1960 | Fed. Rep. of Germany . |
| 8700639 | 1/1987 | Fed. Rep. of Germany . |
| 1102768 | 10/1955 | France . |
| 2146381 | 7/1972 | France . |
| 2203784 | 10/1973 | France . |
| 2448923 | 2/1979 | France . |
| 2630819 | 4/1988 | France . |
| WO89/10527 | 11/1989 | PCT Int'l Appl. . |

*Primary Examiner*—Ronald C. Capossela
*Attorney, Agent, or Firm*—Curtis, Morris & Safford

[57] ABSTRACT

This column, of the type having a cross-undulating lining, includes means for returning liquid to the vicinity of the edges of the lining and liquid and gas distribution means which contribute to decrease substantially the height of the column. Application to plants for separating gases from air.

28 Claims, 19 Drawing Sheets

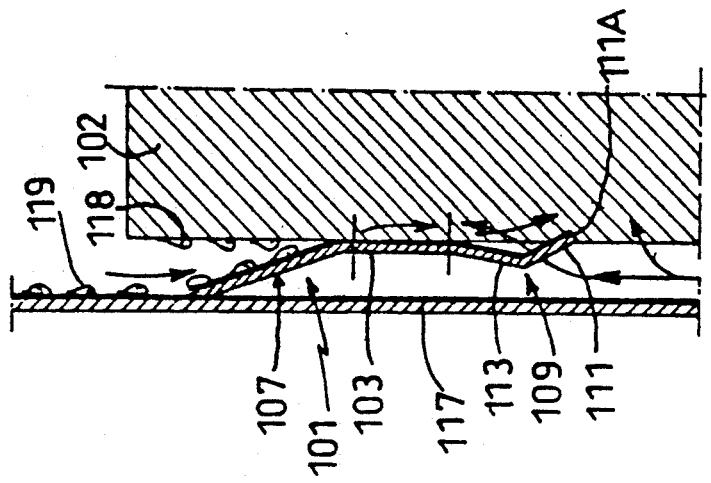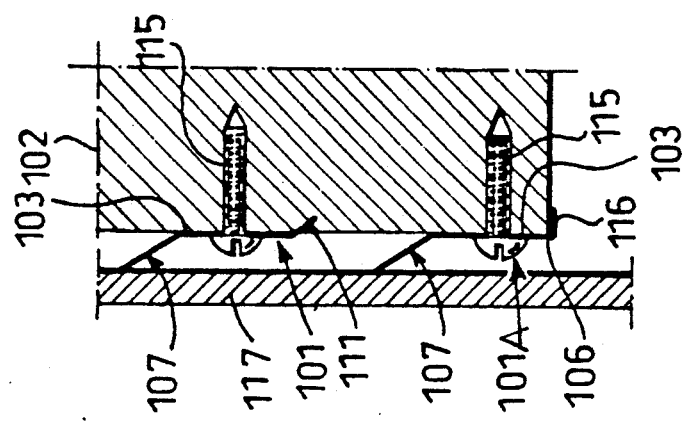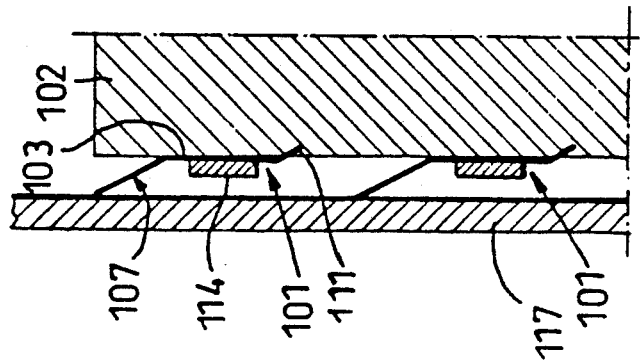

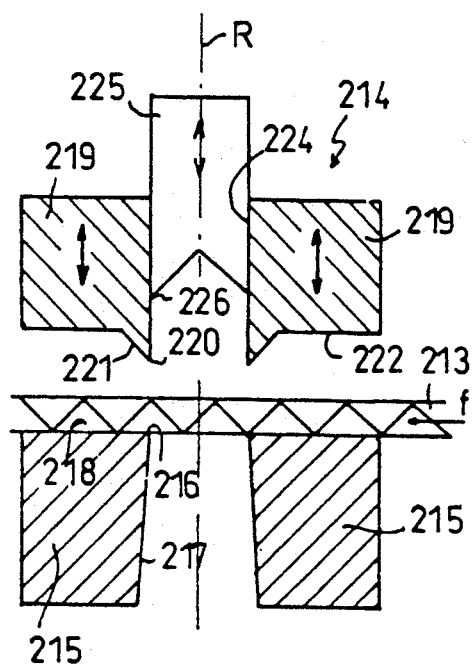
FIG.22
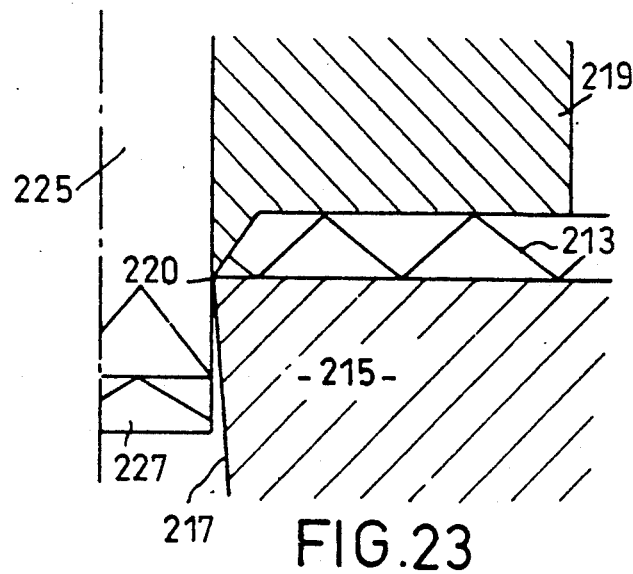
FIG.23
FIG.24
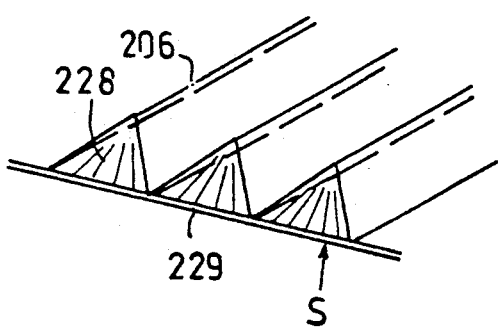
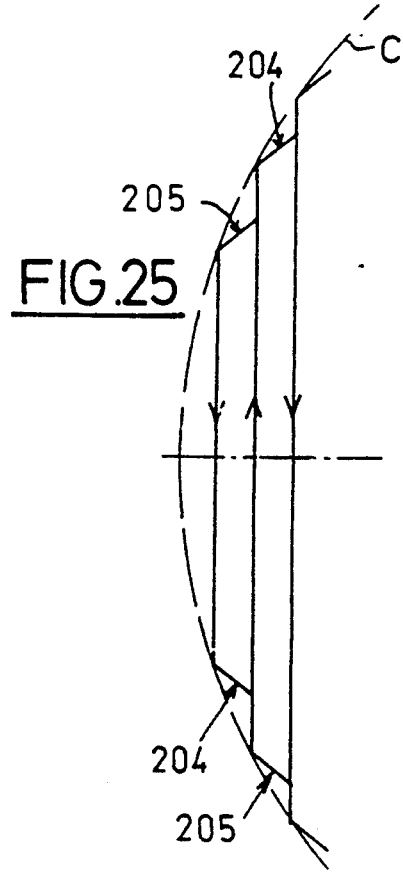
FIG.25

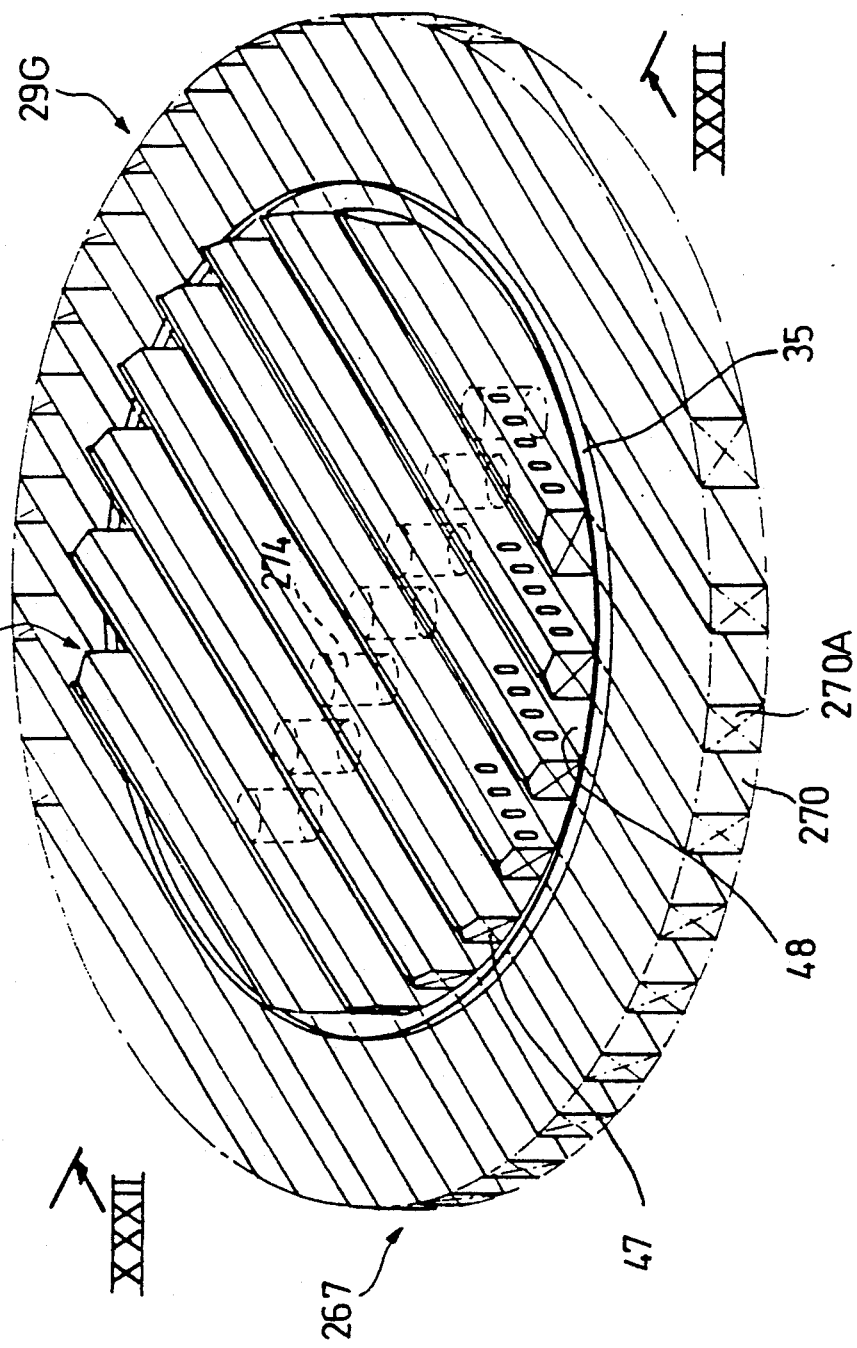

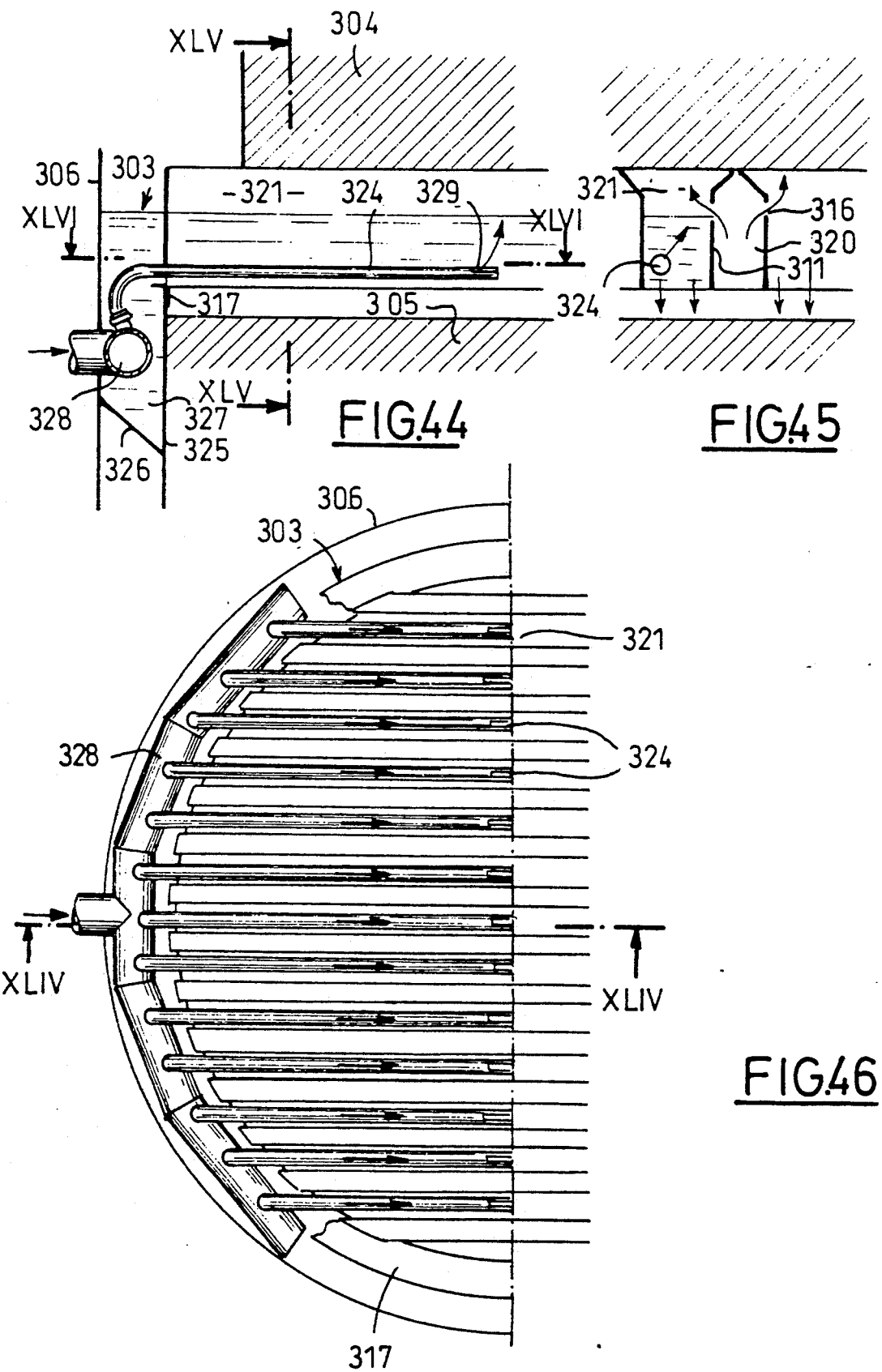

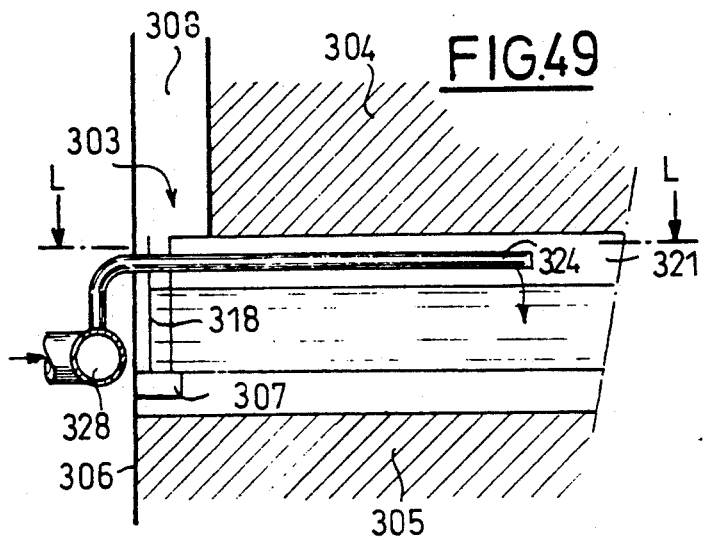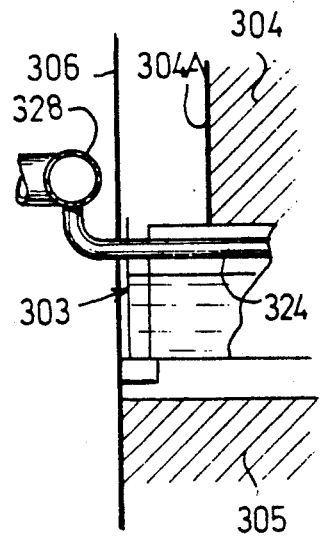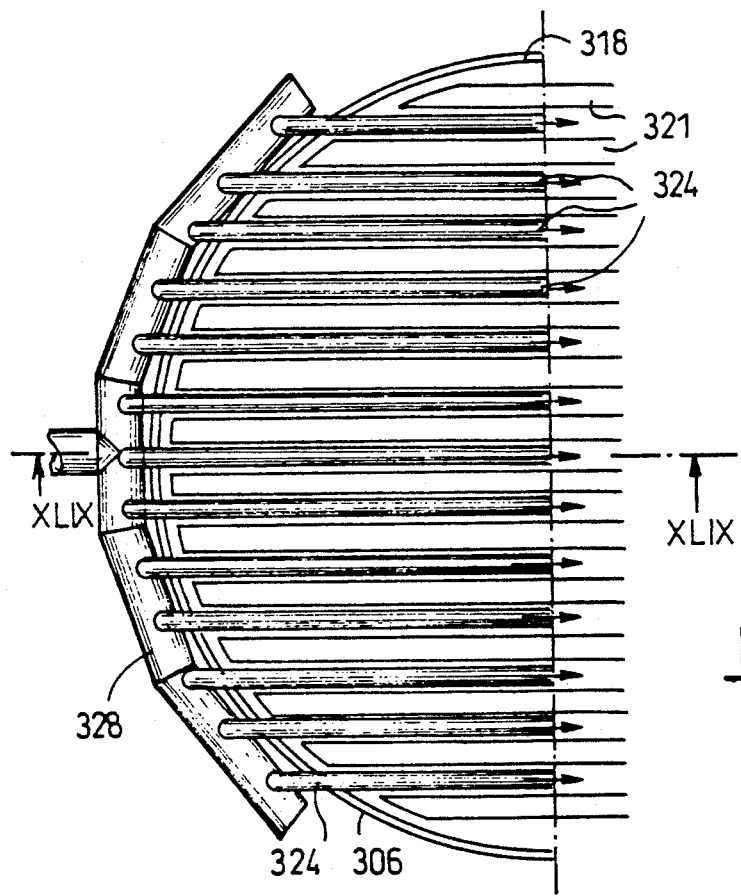

AIR DISTILLATING COLUMN WITH CROSS-UNDULATING LINING

BACKGROUND OF INVENTION (a) Field of the invention

The present invention relates to air distillation columns of the type utilizing on at least part of their height, stacks of packs of organized lining of the cross-undulating type, each pack comprising a bundle of rectangular undulating lamellar sheets each being placed in a generally vertical plane and against one another, the waves of each lamellar sheet being oblique and downwardly directed, in opposite directions from one lamellar sheet to the next one, from a high vertical edge to a low vertical edge of the lamellar sheet.

(b) Description of prior art

Recent developments in the technique of air distillation have consisted in utilizing linings, for example organized linings of the so-called "cross-undulating" type, instead of traditional distillation plates. These linings have indeed an important advantage from the point of view of loss of charge, and consequently permit substantial savings in the operation of the plant. On the other hand, these linings give rise to various technological problems, which are associated in particular with the so-called "partition effect" phenomenon: the descending liquid tends to accumulate on the periphery of the lining or on the partition surrounding it, and from there to stream down without exchanging heat nor material with the ascending gas. This is detrimental to the uniformity of the composition of the liquid on the section of column, and downgrades the performances of the arrangement.

To reduce these undesired effects, it has been proposed to provide intermediate means for the redistribution of the liquid in each distillation section, defined between a lower fluid inlet/outlet unit and an upper fluid inlet/outlet unit. This increases the complexity of the columns and considerably increases the height thereof, for two reasons: the increase of the number of distributors and the substantial height of each distributor. Such a height increase is particularly costly in the case of cryogenic columns provided with a high performance thermic insulation and may require the use of additional liquid ascending pumps, for example from the mean pressure column to the low pressure column.

The invention aims at enabling air distillation columns utilizing cross-undulating linings to achieve high performances with a substantially reduced height.

SUMMARY OF THE INVENTION

For this purpose, it is an object of the invention to provide an air distillation column, of the type in which at least a portion of its height is provided with stacks of packs of organized lining of the cross-undulating type, each pack comprising a bundle of rectangular undulating lamellar sheets each placed in a generally vertical plane and against one another, the waves of each lamellar sheet being oblique and downwardly directed, in opposite directions from one lamellar sheet to the next one, from one upper vertical edge to a lower vertical edge of the lamellar sheet, characterized in that the packs of lining include means for reducing HETP (height equivalent to a theoretical plate) which comprise, in at least one area of each pack, the following two characteristics:

(a) an asymmetrical lateral deformation of the lower edge and/or, in a median part of the lining where the cord of the lining shows little variation, a recess of the lower edge of each lamellar sheet with respect to the upper edge of the two adjacent lamellar sheets; and (b) around the pack and between the latter and a sleeve surrounding same, a sealing device comprising on the one hand a girdle applied against the periphery of the pack and including along its lower edge a series of teeth which are inclined towards the axis of the sleeve, and on the other hand, means sealingly connecting the girdle to the inner wall of the sleeve.

BRIEF DESCRIPTION OF DRAWINGS

Emodiments of the invention will now be described with reference to the annexed drawings, in which:

FIG. 16 is a schematic illustration, in longitudinal cross-section, of part of a distillation column provided with the device of FIGS. 14 and 15;

FIG. 17 is a similar view of a variant;

FIG. 18 is a similar view on a larger scale of the sealing device of FIGS. 14 and 15 mounted on a section of lining;

FIG. 22 is a schematic representation of an instrument for manufacturing a variant of cross-undulating lining of FIGS. 19 to 21;

FIG. 23 illustrates, on a larger scale, the operation of this instrument;

FIG. 24 is a perspective illustration of one end of the lamellar sheets obtained;

FIG. 25 is a partial plan view of the corresponding cross-undulating lining;

FIG. 30 is a schematic illustration of a variant of lining which can be used in the plant according to the invention;

FIG. 31 is a perspective view of a variant of the distributor of FIGS. 2 to 4;

FIGS. 42 to 50 are views on a larger scale taken in cross-section, respectively along lines XLII—XLII of FIG. 43, XLIII—XLIII of FIG. 42, XLIV—XLIV of FIG. 46, XLV—XLV of FIG. 44, XLVI—XLVI of FIG. 44, XLVII—XLVII of FIG. 48, XLVIII—XLVIII of FIG. 47, XLIX-XLIX of FIG. 50, and L—L of FIG. 49; and FIG. 51 illustrates a variant of the object of FIG. 50.

DESCRIPTION OF PREFERRED EMBODIMENTS

Figure 1:
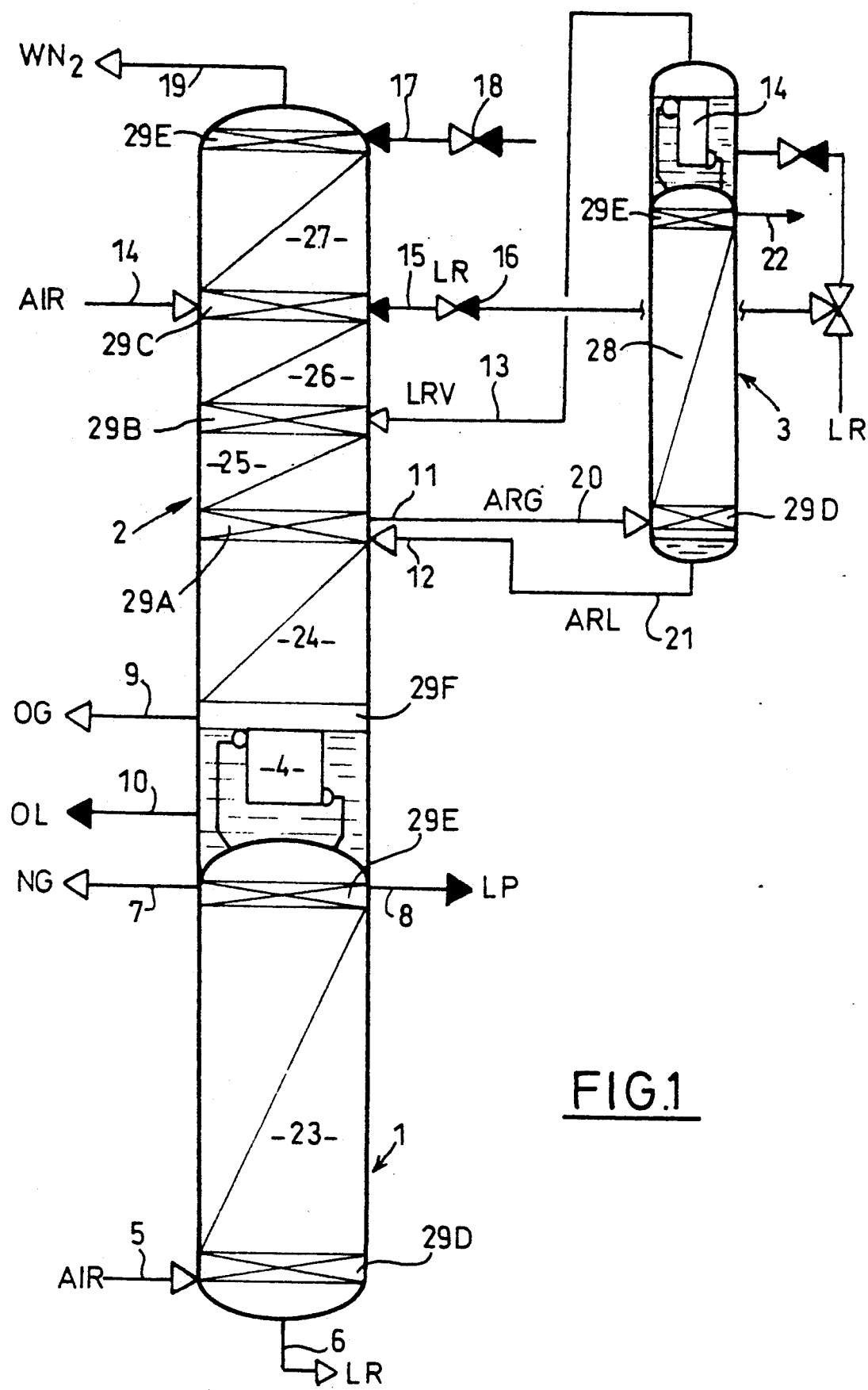
FIG. 1 is a schematic illustration of the general arrangement of an air distillation plant consisting of columns according to the invention.

The air distillation plant illustrated in FIG. 1 consists of a mean pressure column 1, typically operating under about 6 bars absolute, surmounted by a low pressure column 2, which typically operates slightly above atmospheric pressure and to which is connected a column 3 for the production of impure argon. A condenser-vaporizer 4 establishes heat exchange relationship between the vapor at the top of column 1, consisting of nearly pure nitrogen, and the liquid at the bottom portion of column 2, consisting of nearly pure oxygen.

The illustration of FIG. 1 is very schematical and essentially aims at showing the fluid inlets/outlets of the plant, as well as the distillation sections that they define. Thus:

column 1 includes two fluid inlets/outlets units, namely at the bottom, an inlet 5 for air to be treated and an outlet 6 for "rich liquid" (oxygen enriched air), and, at the top, an outlet 7 of mean pressure gaseous nitrogen and an outlet 8 of "poor liquid" (nearly pure nitrogen);

column 2 includes five fluid inlets/outlets units:
at the bottom, an outlet 9 for gaseous oxygen and an outlet 10 for liquid oxygen;
at a first intermediate level, a gas outlet 11, so-called "argon bleeding", leading to the bottom of column 3, and a return 12 for re-injecting into column 2, liquid from the bottom portion of column 3;
at a second intermediate level, an inlet 13 of vaporized "rich liquid" originating from the top of condenser 14 of column 3;
at a third intermediate level, an inlet 14 for low pressure blowing air and an inlet 15 for "rich liquid" expanded in a pressure release valve 16; and
at the top of the column, an inlet 17 for "poor liquid" which is expanded in a pressure release valve 18 and an outlet 19 for residual gas (impure nitrogen);

column 3 for the production of impure argon includes two fluid inlet/outlet units, namely, at the bottom, gas inlet 20 originating from column 2, and a bottom liquid outlet 21 leading to column 2, and, a the top, an outlet 22 for impure produced argon.

These various fluid inlets/outlets define six distillation sections, namely:

in mean pressure column 1, a single distillation section 23 between lower inlet/outlet unit 5, 6 and upper inlet/outlet unit 7, 8;

in low pressure column 2:
a lower distillation section 24 between its lower inlet/outlet unit 9, 10 and its upper inlet/outlet unit 11, 12;
immediately above the latter, a first intermediate distillation section 25 between its lower inlet/outlet unit 11, 12 and its upper inlet/outlet 13;
immediately above the previous one, a second intermediate distillation section 26 between its lower inlet/outlet unit 13 and its upper inlet/outlet unit 14, 15; and
an upper distillation section 27 between its lower inlet/outlet unit 14, 15 and its upper inlet/outlet unit 17, 19;

with respect to the column for the production of impure argon 3, a single distillation section 28 between the lower inlet/outlet unit 20 and the upper inlet/outlet unit 22.

As will be observed, depending on the distillation section under consideration, a same inlet/outlet unit may be considered either as an upper inlet/outlet unit, or as a lower inlet/outlet unit.

Each of the distillation sections 23 to 28 consists of blocks or "packs" of organized lining of the "cross-undulating" type.

As it is well known, a pack of cross-undulating lining consists of a bundle of undulating lamellar sheets each disposed in a generally vertical plane and joined side by side, each lamellar sheet having a generally rectangular shape. The lamellar sheets are obliquely undulated, and the direction of inclination of the waves is reversed from one lamellar sheet to the next one. All the lamellar sheets have the same height, while their lengths, or horizontal dimension, increases by a minimal value, for an end lamellar sheet, to a maximum value for the median lamellar sheet, then decreases to the same minimal value for the lamellar sheet at the other end.

Each section 23 to 28 is a section of continuous lining, i.e. a section consisting of a direct stacking of elementary packs over one another, without any intermediate device for the redistribution of fluid, each elementary pack being rotated 90°, around the axis of the column, with respect to the two adjacent packs, as schematically illustrated in FIGS. 5, 7, 8 and 11. This is made possible, in spite of the substantial height of some sections, such as in the case of sections 23, 24 and 28, which may respectively comprise 40, 38 and 50 theoretical plates, by means of many characteristics which will appear hereinafter.

The distillation sections 24 and 25 on the one hand, 25 and 26 on the other hand, and finally, 26 and 27 are separated from one another by means of a sandwich distributor, respectively 29A, 29B and 29C, which will now be described with reference to FIGS. 2 to 4 under the general reference numeral 29.

Figure 2:
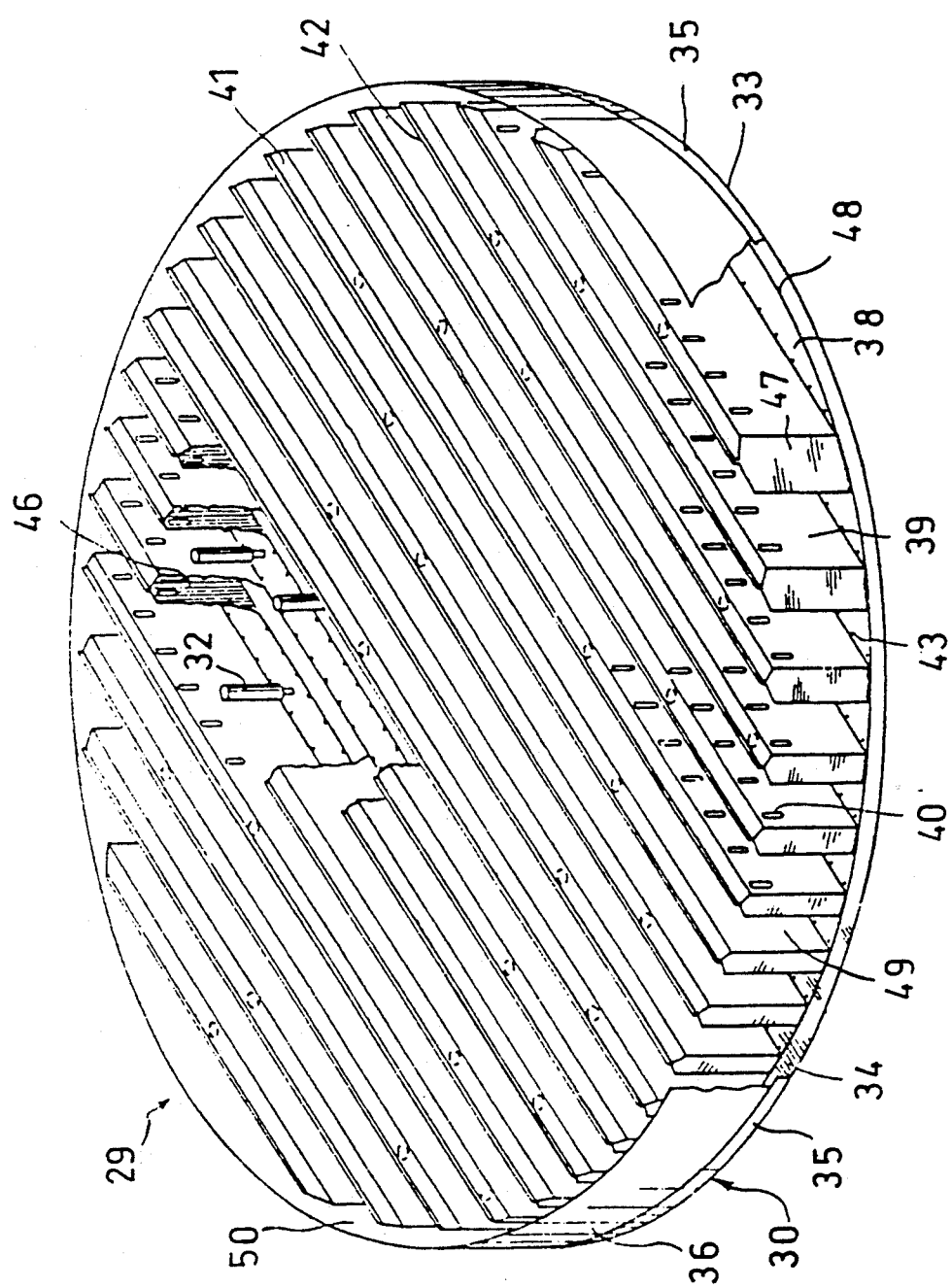
FIG. 2 is a view in perspective, partially cut away, of a fluid distributor used in this plant.
Figure 3:
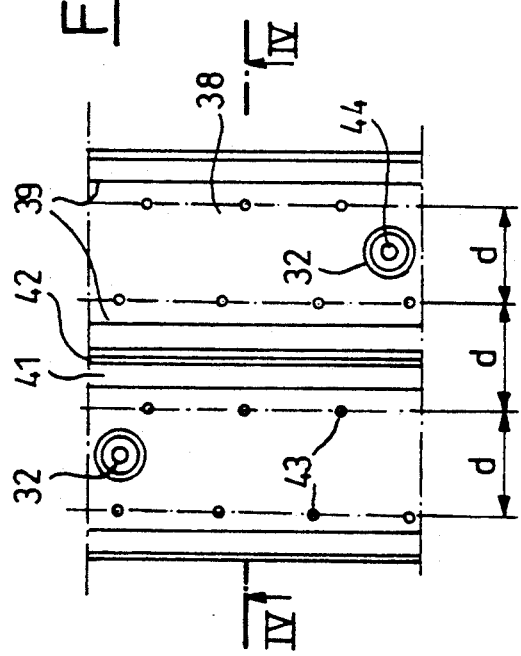
FIG. 3 is a partial view from above of the distributor of FIG. 2.
Figure 4:
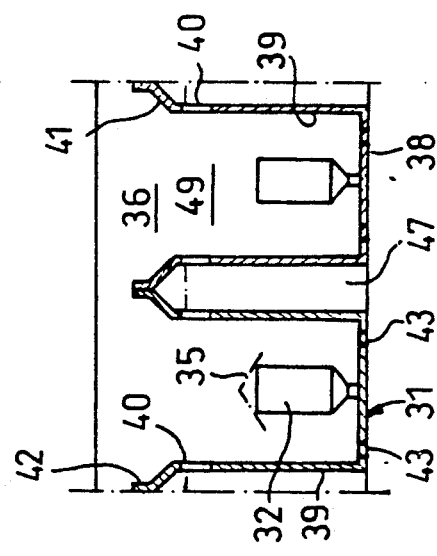
FIG. 4 is a partial transverse cross-section in elevation, taken along line IV—IV of FIG. 3.

The distributor 29 illustrated in FIGS. 2 to 4 is such as described in Patent Application FR-A-2 655 877 in the name of the Applicant. This distributor consists of a peripheral annular ring 30, a series of U-shaped members 31 and a series of overflow chimneys 32.

Ring 30 comprises a circular peripheral L-shaped member 33 including a lower horizontal wing 34 and an exterior upwardly directed rim 35. An upwardly projecting cylindrical skirt 36 is fixed on the rim. In certain cases, as will be seen later, this skirt 36 and the rim 35 are suppressed.

Each shaped member 31 (FIGS. 3 and 4) consists of a perforated horizontal bottom 38 bordered by two parallel vertical walls 39. Each wall 39 includes, along its upper edge, a horizontal row of oblong orifices 40 with longer vertical axis, the orifices of one partition 39 being set off by one half-pitch with respect to those of opposite partition 39. Each partition 39 obliquely extends in the upper direction towards the exterior of the shaped member 31 into a half-roof 41 which is terminated by an upwardly directed narrow vertical border 42.

The shaped members 31 are disposed side by side, so that their half-roofs 41 meet, the adjacent borders 42 being applied against one another along their entire length and being fixed together by appropriate means (not illustrated) which are impervious to liquid but not necessarily impervious to gas, for example by means of welding points or clamping.

Each bottom portion 38 includes a row of holes 43 along each partition 39. The two rows are set off by one half-pitch with respect to one another, and the size of the half-roof 41 is such that, as seen in plan view (FIG. 3), the distance d between the rows of holes is the same whether these rows belong to the same shaped member 31 or to two adjacent shaped members. There is thus obtained on the entire surface of the distributor a regular mesh of holes 43, as seen in plan view, with one mesh in the shape of a lozenge.

Moreover, each bottom portion 38 includes in its median longitudinal plan, at regular distances which are substantially higher than the pitch of the holes 43, an orifice 44 of larger diameter in which the narrow lower end of a chimney 32 is inserted. These chimneys have the shape of a funnel which rises up to a level slightly lower than that of the lower edge of the openings 40. A conical Chinese hat 45, illustrated in dotted line in FIG. 4, may cap each chimney 32.

Each shaped member 31 is cut into length, transversely or obliquely, so as to rest by means of each end thereof on the wing 34 of the ring 30. Each end of each space 46 located between two adjacent shaped members is hermetically closed, at least up to the level of the lower edge of the oblong orifices 40, by means of a vertical pad 47 of corresponding shape, which is welded along its lateral edges and whose lower edge is flush with the lower face of the bottom portions 38.

The lower edges of the pads 47 and the ends of the bottom portions 38 are welded on the wing 34 by means of an impervious continuous weld 48.

Thus, the distributor defines a certain number of spaces 49, for the collection of liquid, which are bound by a bottom portion 38 and the two vertical partitions 39 of the same shaped member, these spaces 49 alternating with the spaces 46 mentioned above, which are spaces for the passage of gas. The distributor also defines a peripheral channel 50, which is bound by the edge 35 and the skirt 36 of the annular ring 30 and which is in communication with the group of spaces 49.

As further described more in detail, the plant also includes, at the top and at the bottom of each of the three columns, distributors which are derived from distributor 29 described above, namely a bottom distributor at the bottom of each of the distillation sections 23, 24 and 28, and a top distributor at the top of each of these three sections. These top and bottom distributors, by their structure and their connection with adjacent linings, contribute, as the intermediate distributors, to reduce the height of the columns of the plant.

Figure 5:
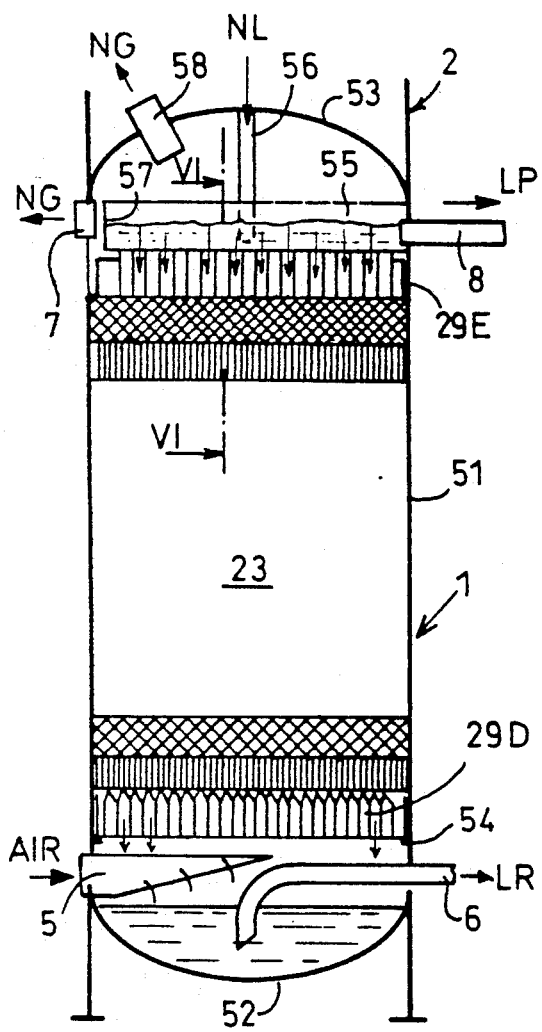
FIG. 5 is a schematic illustration in longitudinal cross-section of the mean pressure column of the plant.

FIG. 5 illustrates the construction of the mean pressure column 1.

Column 1 includes a cylindrical sleeve 51 which is closed at the bottom by means of a lower convex bottom 52 and at the top by means of an upper convex bottom 53. Vat distributor 29D, which is constructed as a distributor 29 of FIGS. 2 to 4, rests on peripheral supports 54 fixedly mounted at the base of the sleeve. The air inlet 5 and the rich liquid outlet 6 open below this distributor 29D.

Figure 6:
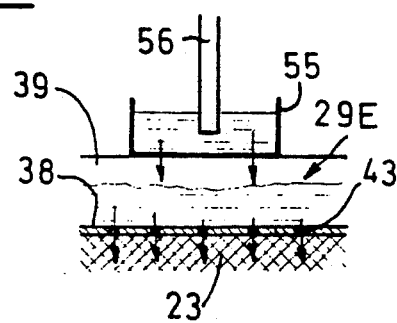
FIG. 6 is a partial cross-section view taken along line VI—VI of FIG. 5.

The diameter of section 23 corresponds to the interior diameter of the sleeve and section 33 is directly mounted on the upper borders 42 of the distributor 29D. The top distributor 29E directly rests on the upper pack of this section 23. This distributor differs from distributor 29D by the fact that the partitions 39 are devoid of openings 40 and inclined wings 41. A trough 55 which is opened in the upward direction (FIGS. 5 and 6) is placed, perpendicularly to the partitions 39, on the latter, and extend nearly along the entire diameter of the sleeve 51, at the level of the top of the latter. The bottom of this trough is perforated perpendicularly to the liquid spaces 49 of the distributor. A vertical tube 56 for the return of liquid nitrogen condensed in the vaporizer-condenser 4 extends through bottom 53 and penetrates into the trough 55. The poor liquid outlet 8 starts from one end of this trough. Also seen on FIG. 5 is the outlet of gaseous nitrogen 7, located opposite an end plate 57 of the trough, and a duct 58 which extends to bottom 53 and brings gaseous nitrogen to the vaporizer-condenser 4.

Figure 7:
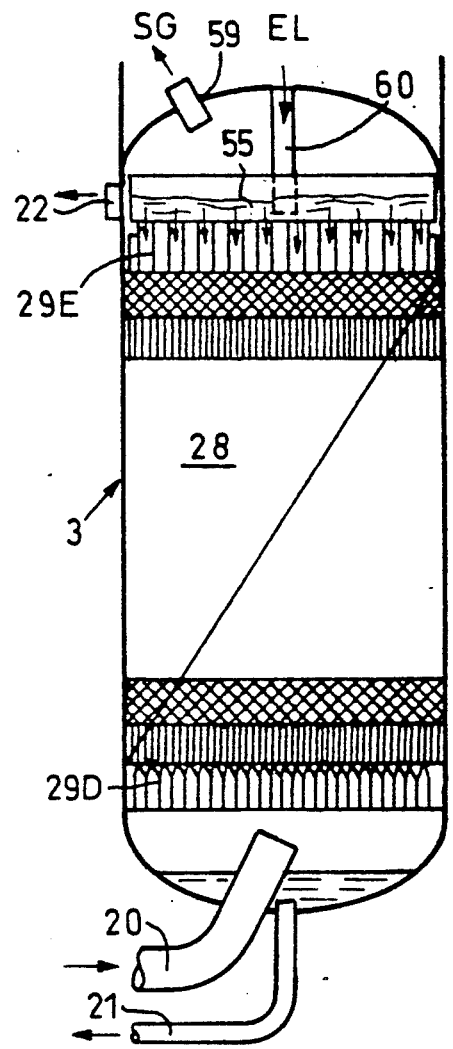
FIG. 7 is a similar view of the column for the production of impure argon, of the plant.

The column for the production impure argon 3, illustrated in FIG. 7, is constructed similarly as column 1, except for the following differences. At the bottom, the gas inlet and the liquid outlet are inlets/outlets 20 and 21 mentioned above. At the top, pipes 59, 60 passing through the upper bottom lead the top vapor towards the head condenser 14 and returns the condensate to the trough 55. As previously, the outlet 22 for impure argon is located opposite the end plate of the trough 55, but, obviously, no liquid outlet at the top of the column is provided.

The low pressure column 2 will now be described from top to bottom, with reference to FIGS. 8 to 13.

Column 2 comprises a cylindrical sleeve 61 extending along the entire height of the column, and is connected at its base to the upper bottom 53 of column 1 and at the top thereof to an upper convex bottom 62 which is provided at its top with residual gas outlet 19.

Distributor 29C is mounted on supports 63 which are unitary with the sleeve. The distillation section 27 is mounted on this distributor and spaces 64 are provided therebetween. Two series of tubes 65 which are perpendicular to the liquid and gas spaces of the distributor extend through spaces 64. The rich liquid inlet 15, being a diphasic fluid inlet, is in fact made of a phase separator 66 and two ducts 15A, 15B respectively originating from the top and bottom of this separator and each feeding one of the two series of tubes. The tubes 65 are perforated, those corresponding to the liquid being opposite the liquid spaces of the distributor 29C.

Figure 8:
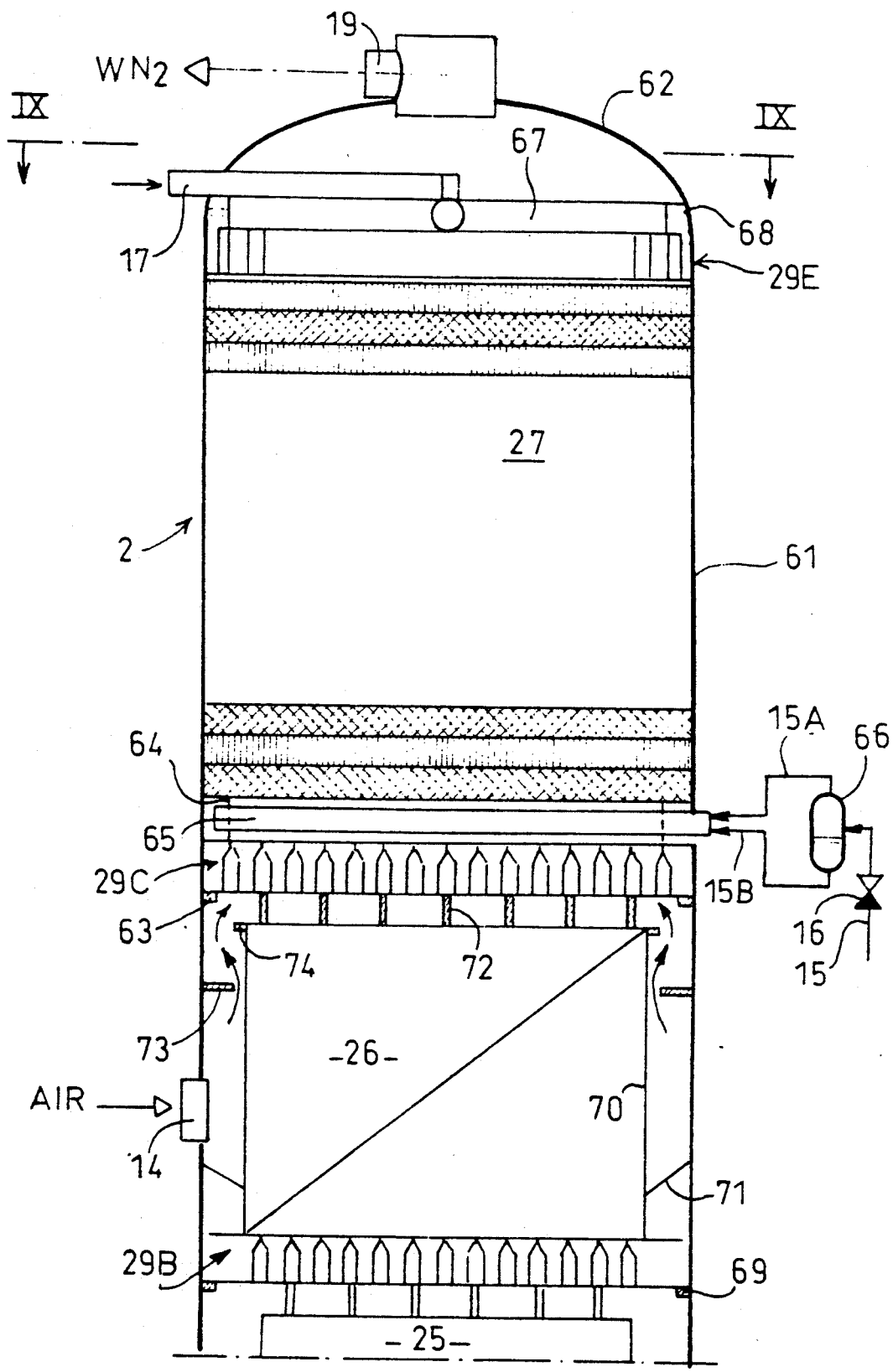
FIG. 8 is a similar view of the upper part of the low pressure column.
Figures 9, 11, 12:
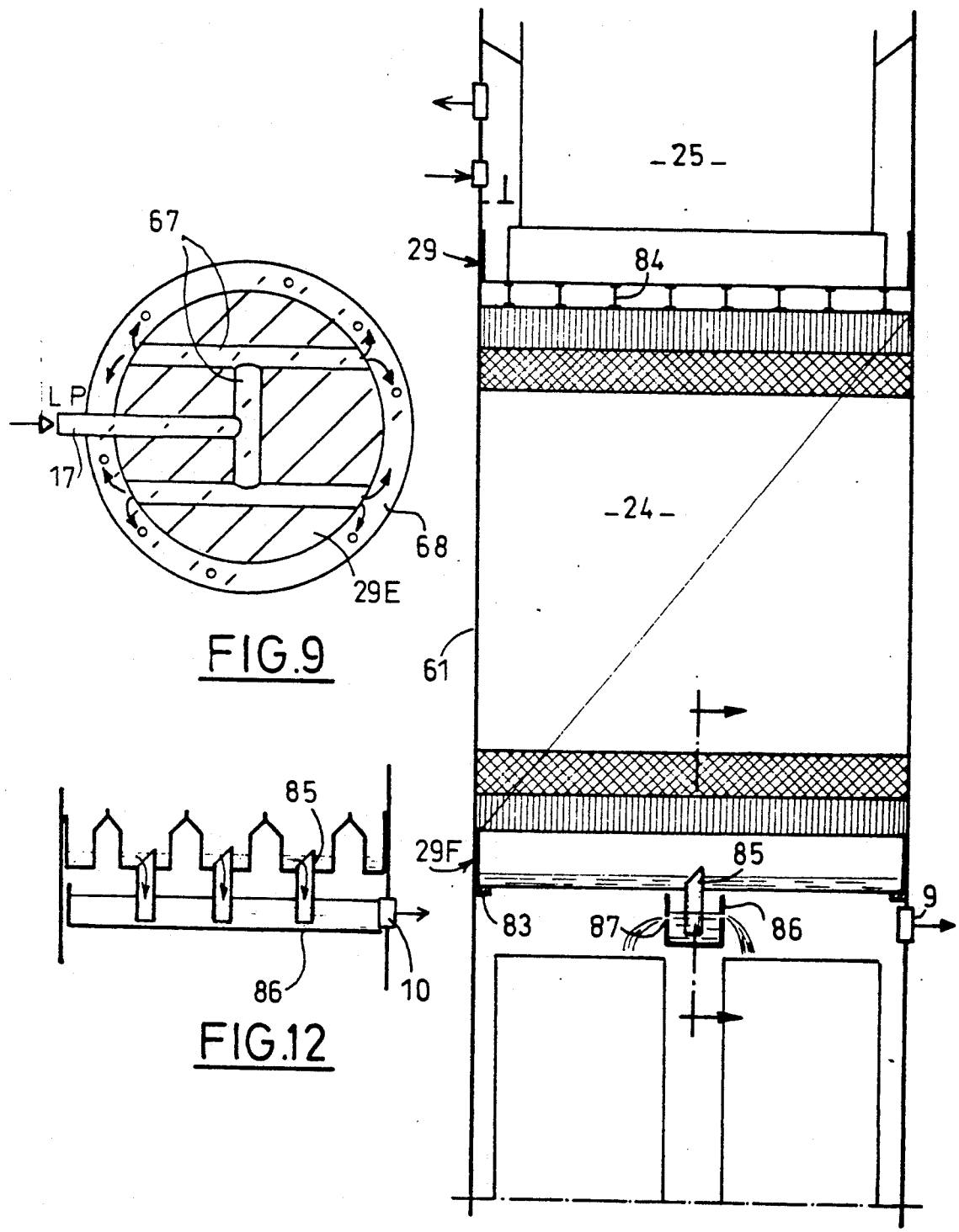
FIG. 9 is a cross-section view taken along line IX—IX of FIG. 8.
FIG. 11 is a similar view of the inner part of this lower pressure column.
FIG. 12 is a cross-section view taken along line XII—XII of FIG. 11.

A distributor 29E which is identical to the one described above, rests on section 27. However, liquid feeding into this distributor is different. As shown in FIGS. 8 and 9, the inlet 17 is a tube which penetrates horizontally immediately above distributor 29E and which distributes the liquid, via a plurality of tubes 67 arranged in H, into a peripheral trough 68 which is perforated opposite the peripheral channel of the distributor.

Distributor 29B is mounted on peripheral supports 69 which are unitary with the sleeve. Distillation section 26 is enclosed within an auxiliary sleeve 70 of smaller diameter than that of sleeve 61, and the assembly is directly placed on the horizontal support surface of the distributor 29B formed by the group of end slices of the edges 42 of shaped members 41, all this being made possible by the high rigidity of the multiple beam structure of the distributor.

An annular sealing device 71 sealingly connects the lower part of sleeve 70 to the area opposite sleeve 61, and the top of section 26 is spaced from distributor 29C by means of spaces 72.

An annular ring 73 defining a baffle is fixed to sleeve 61 opposite the upper part of sleeve 70, and the air blowing inlet 14 opens between this ring and the sealing device 71. As can be seen in FIG. 8, another annular ring 74 defining a baffle may be fixedly mounted on the periphery of the top of sleeve 70.

Figure 10:
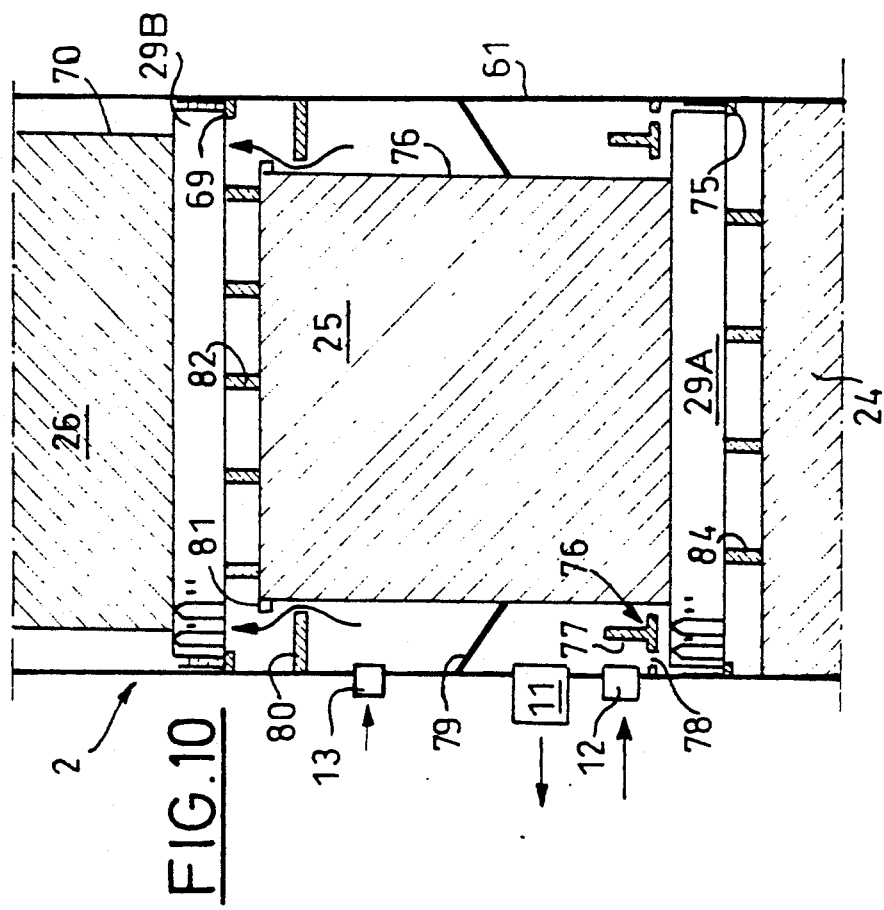
FIG. 10 is a schematic longitudinal-cross-section view of an intermediate portion of the low pressure column.

As seen in FIG. 10, distributor 29A is placed on supports 75 which are unitary with sleeve 61. The distillation section 25, which is enclosed in an auxiliary sleeve 76 whose diameter is smaller than that of sleeve 70, is placed directly over distributor 29A. An annular ring 76 defining a baffle is fixed to sleeve 61 immediately above distributor 29A. This ring includes an edge 77 and, between the latter and the sleeve 61, an annular distribution of orifices 78. Inlet 12 opens immediately above this ring, and the outlet 11 is slightly above inlet 12. An annular sealing device 79 similar to device 71 is provided above outlet 11, and a double ring-baffle 80, 81 similar to double ring 73, 74 is provided in the upper end area of the sleeve 76. The top of section 25 is spaced from the distributor 29B by means of braces 82. The inlet for vaporized rich liquid 13 opens between the sealing device 79 and double annular ring 80, 81.

With reference to FIG. 11, the bottom distributor 29F of column 2 is supported by means of supports 83 which are fixedly mounted on sleeve 61. Distillation section 24 is directly mounted on this distributor, its diameter is the same as the interior diameter of the sleeve, and is spaced, at the top thereof, from distributor 29B by means of braces 84.

Distributor 29F is similar to distributor 29 of FIGS. 2 to 4, and in addition, at half length of each space of liquid, there is additionally provided a descending tube 85 which opens in a trough 86 which is perpendicular to said liquid spaces and is supported at its ends, in appropriate manner, by means of sleeve 61. Trough 86 has a drain 87 on both sides thereof which enables the collected liquid oxygen to feed the vaproizer-condenser 4, which, in this example, is made of two heat exchange bodies of streaming type, such as described in Patent EP-B-120 122 in the name of the Applicant.

As a variant, the spaces of liquid of distributor 29F may pour liquid oxygen directly into the bottom portion of column 2, if the vaporizer-condenser 4 is of a better known type with thermosiphon as schematically illustrated in FIG. 1.

Figure 13:
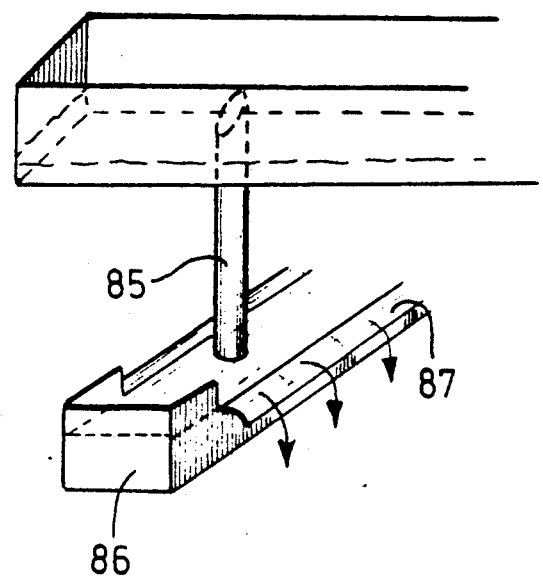
FIG. 13 is a perspective view of a detail of the object of FIGS. 11 and 12.

In the example of FIGS. 11 to 13, the gaseous oxygen outlet 9 is immediately below distributor 29F, and the liquid oxygen outlet 10 is at one end of trough 86.

It should be noted that the presence of braces 72, 82, 84 under the intermediate distributors facilitates the good distribution of the ascending gas in the distillation sections in case of variations of the flows of gas which are withdrawn or injected, to the detriment of a slight excess of the height of the double column. On the other hand, it will be seen that the diameters of sections 25 and 26 are reduced as a function of the gas inlets/outlets 11, 13 and 14, and that this reduction of diameter has been used to mount the fluid inlets/outlets without loss of height.

An example of sealing device which can ensure imperviousness between a distillation section and the sleeve surrounding it, for example between section 24 or 27 and sleeve 61, will now be described, although it is described below in a general manner.

Figure 14:
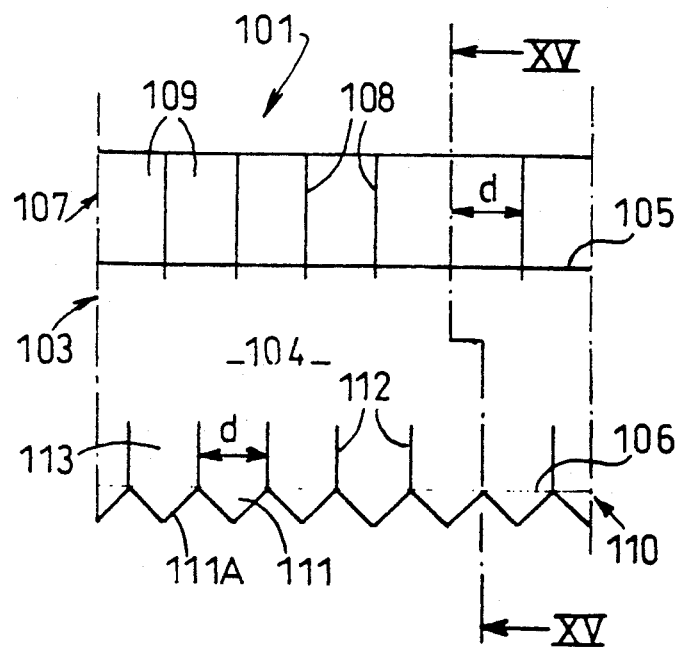
FIG. 14 is a view in elevation of a sealing device used in the plant according to the invention.
Figure 15:
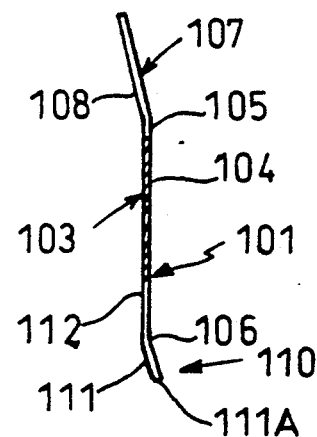
FIG. 15 is a cross-section view taken along line XV—XV of FIG. 14.

The sealing device 101 illustrated in FIGS. 14 and 15 is prepared from a continuous band of an appropriate elastic material of small thickness such as a metal or a plastic material. This band is disposed around a cylindrical section or "pack" 102 of lining of the "cross-undulating" type, partially and schematically illustrated in FIGS. 16 to 18, all in a manner that its end edges are joined and be imperviously connected by any known means, for example by overlapping and simultaneous bonding on the section of lining.

As seen in FIGS. 14 and 15, the band mentioned above has three zones which extend along its entire length:

a median zone or girdle 103, vertically oriented, whose intermediate portion 104 is continuous and which is bound by a horizontal upper edge 105 and a horizontal lower edge 106;

an upper zone 107 which constitutes an acute angle relative to the vertical, by folding along edge 105, in a first direction, the portion of the band located above this edge. This zone 107 includes at regular intervals vertical cuts 108 which extend from its upper free edge and slightly penetrate into girdle 103. These cuts 108 define therebetween a corresponding number of flexible tongues 109;

a lower zone 110 made of teeth 111 in the form of isoceles triangle, which are adjacent to one another and each terminating into a lower tip 111A, the edge 106 defining the whole of the bases of these triangles. This zone is folded along edge 106 in a direction which is opposite the upper zone 107 (FIG. 15), which gives the band the general shape of an S.

From each point which is common to two consecutive teeth, located on the edge 106, there is an upwardly directed vertical cut 112 provided in girdle 103. The cuts 112 are equidistant and separate from one another by the same distance d as the cuts 108, and they are set off one half-pitch with respect to the latter. The cuts 112 and the teeth 111 thus define a series of flexible tongues 113 which are adjacent one another.

A first method of mounting the device, which is more particularly adapted to distillation columns of large diameter, is illustrated in FIG. 16. It consists of a hooping 114 which firmly applies the intermediate portion 104 of the girdle against the periphery of the section of lining 102.

As a variant (FIG. 17), the intermediate portion 104 is applied against the periphery of the lining by direct screwing by means of one or more rings of radial screws 115 which pass through this portion 104. This variant is particularly suitable for distillation columns of small diameter.

In both cases, there may be provided a plurality of identical sealing devices which are distributed along the height of the section of lining, as illustrated in FIG. 16, and a similar device 101A (FIG. 17) may be fixed at the base of this section in which device 101A, the teeth 111 and the cuts 112 are suppressed while a horizontal heel 116 projects inwardly from the edge 106 and is applied against the lower end slice of the section of lining.

In all cases, the outer diameter of zone 107 is higher than the inner diameter of sleeve 117 of the distillation column. Thus, when the section of lining is inserted into this sleeve 117, the tongues 109 are inwardly bent to be elastically applied against the interior partition of the sleeve, so as to provide an imperviousness to gas and liquid at this location.

FIG. 18 illustrates more in detail the arrangement of the device 101 after fixing it on a section of lining 102, it being understood that this fixing is carried out by means of two rings of screws indicated by their axes: only portion 104 is applied against the cylindrical periphery of section 102, and the teeth 111 penetrate more or less between the lamellar sheets of the lining. In so doing, they compel the tongues 113 to correspondingly bend outwardly.

It should be noted, in this respect, that in the embodiments described, because the spacing between the general planes of the lamellar sheets is constant, the teeth 111 may not be all opposite a gap separating two lamellar sheets, whatever the value of the pitch d. To obtain such a result, it would be necessary to vary the width of the teeth and to mount the device 101 on the lining with a determined angular orientation, which constitutes a variant of the invention.

In operation, as indicated by arrows on FIG. 18, the imperviousness which is obtained in the manner explained above, between the tongues 109 and the sleeve 117, compels all the ascending gas to penetrate into the section of lining. Moreover, the liquid 118 which glides along the vertical end edge of the lamellar sheets, as well as any liquid 119 which would glide along the sleeve, is guided along each tongue 113 until reaching a corresponding tip 111A, which tends to send it inside the pack 102.

Thus, device 101 operates not only in stopping gas and liquid contained in the annular space which separates the pack from the sleeve, but also is responsible for returning liquid in the pack which acts against the partition effect.

Each elementary pack of each section of lining may be such as described in FR-A-2 630 819 in the name of the Applicant, whose content should be considered as incorporated by reference in the present application. As a variant, the pack may be according to one of the examples which will be generally described below, with general reference to FIGS. 19 to 29.

Figure 19:
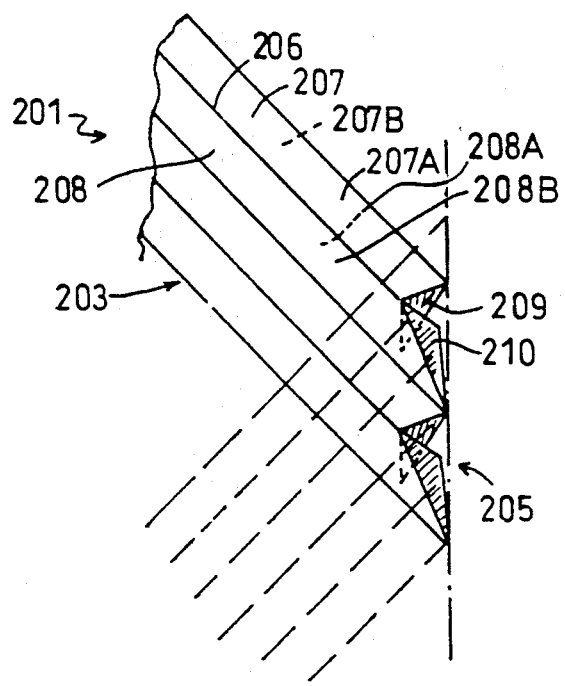
FIG. 19 is a perspective view of the lower edge of a lamellar sheet of a cross-undulating lining.

FIG. 19 illustrates an undulated metallic lamellar sheet 201 intended to constitute a cylindrical section or "pack" 202 (FIG. 21) of cross-undulated lining.

Lamellar sheet 201 is rectangular and is in a general vertical plane P. It is undulated in oblique direction; the waves 203 have a triangular cross-section and downwardly extend from a first vertical edge 204 of the lamellar sheet to its opposite vertical edge 205. In the present specification, the edge 204 is designated as "high edge" and the edge 205 is referred to as the "low edge". Upon considering the flow of a liquid on the lamellar sheet, the edge 204 may also be called "centripetal edge" since a drop of liquid deposited on this edge flows by gravity towards the median zone of the lamellar sheet, and the edge 205 is called "centrifugal edge" for a similar reason.

Each wave 203 defines a peak of linear wave 206, assumed ahead of the plane of FIG. 19, and two wings including upper wing 207 and lower ring 208 originating from this peak. To constitute the pack 202, an assembly of lamellar sheets such as lamellar sheet 201, all of the same height, are stacked against one another, with their waves alternately going down in opposite directions, as indicated in FIG. 19, in which the waves of the lamellar sheet which is adjacent to lamellar sheet 201 have been illustrated in dotted line. Thus, in an end view (FIG. 20) one can alternately see the high edge 204 of a lamellar sheet, the low edge 205 of the following lamellar sheet, the high edge 204 of the following lamellar sheet, etc.

Figure 21:
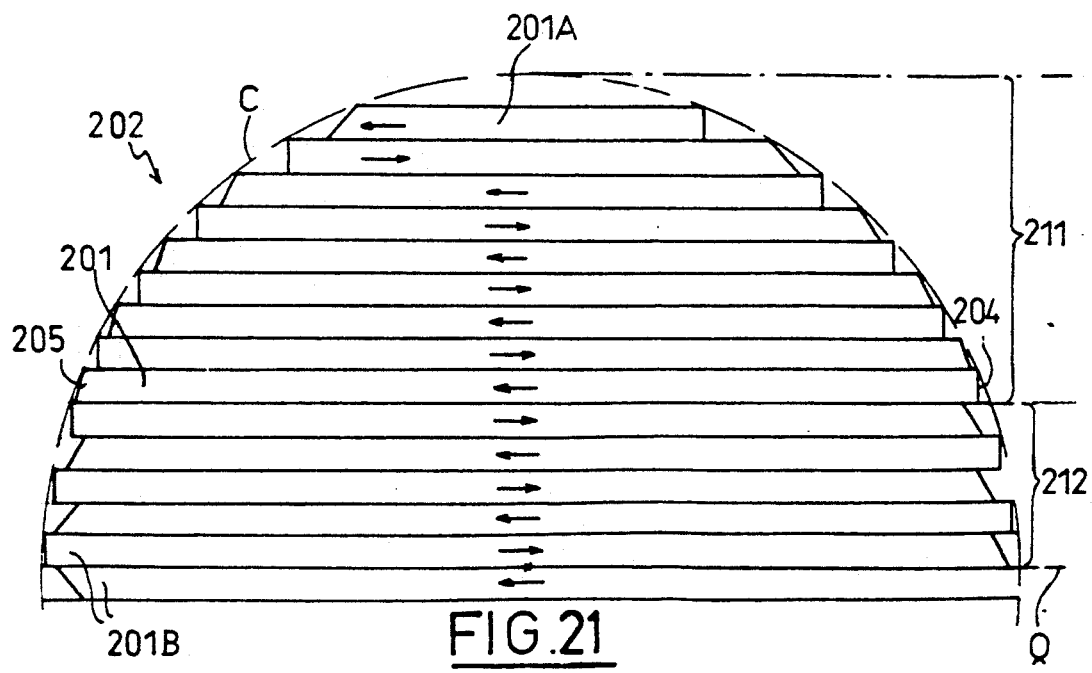
FIG. 21 is a plan schematic half-view of the corresponding cross-undulating lining.

The lamellar sheets are also cut into lengths so as to be approximately enclosed within a circle C (FIG. 21). Thus, the lengths of the lamellar sheets increase from a minimum value for an end lamellar sheet 201A up to a maximum value for the lamellar sheet 201B located approximately in the diametral plane Q parallel to the lamellar sheets of the pack, then the length again decreases to the minimum value mentioned above for the lamellar sheet at the other end.

The high edge 204 of each lamellar sheet is cut straight, without deformation, and therefore provides a zig-zag configuration also distributed on either side of the general vertical plane P of the lamellar sheet.

On the other hand, the low edge 205 of each lamellar sheet is asymmetrically deformed: a cut is made along each wave peak 206 from the low edge, and the end portion of the upper wing 207 thus defined is folded downwardly by forming a first folded tongue 209. Possibly, as illustrated, the end portion of the lower wing 208 is then folded again in the upward direction, by forming a second folded tongue 210. In end view (FIG. 20), the tongue 210 then partially covers tongue 209.

As illustrated in FIG. 21, two zones are noted on each side of the diametrical plane Q, namely a radially extending exterior zone 211 in which the length of the cord of the circle C parallel to the plane Q varies clearly from one lamellar sheet to the next one, and a median zone 212 in which this cord length has little variation from one lamellar sheet to the next one.

In zone 211, starting from lamellar sheets having substantially the length of the corresponding cords, the mere folding of the tongues 209 and 210 towards the plane Q causes these tongues to be opposite an end region of the adjacent longer lamellar sheet, at a small distance from the high edge of the latter.

On the other hand, in zone 212, tongues 209 and 210 would run the risk of extending beyond the high edge of the adjacent lamellar sheet. To prevent this, it may be preferable to slightly shorten the lamellar sheets on their low edge side, with respect to the corresponding cords of the circle C, as illustrated in FIG. 21. Thus, in this zone 212, the condition obtained naturally in zone 211 is artificially recreated, namely the fact that the tongues 209, 210 are folded towards the longer adjacent lamellar sheet and is opposite a marginal zone of the latter.

In practice, circle C is in the form of one or more girdles or a sleeve, with peripheral sealing means, such as those described above and in FR-A-2 630 819 mentioned above.

In operation, the lining puts a ascending gas and a descending liquid in heat and material exchange relationship. The liquid streams along the upper faces 207A and 208A and lower faces 207B and 208B, respectively, of wings 207 and 208.

Immediately before reaching low edge 205, the liquid which is on faces 207A and 207B meets tongue 209, which forces it to take a more inclined direction towards the longer adjacent lamellar sheet. This liquid is thus caught by the centripetal waves of the latter lamellar sheet and is sent towards the median zone of the lamellar sheets.

Similarly, the liquid which is on faces 208A and 208B is deflected, either by tongue 209, whose lower edge is near this face, or by tongue 210, towards the same adjacent lamellar sheet, and is thus also sent towards the median zone of the lamellar sheets.

As seen in FIG. 21, the liquid has a global tendency to be brought back not only towards the median zone of the lamellar sheets, but also towards the diametrical plane Q.

The accumulation of liquid at the periphery of the lining is thus very low.

Figure 20:
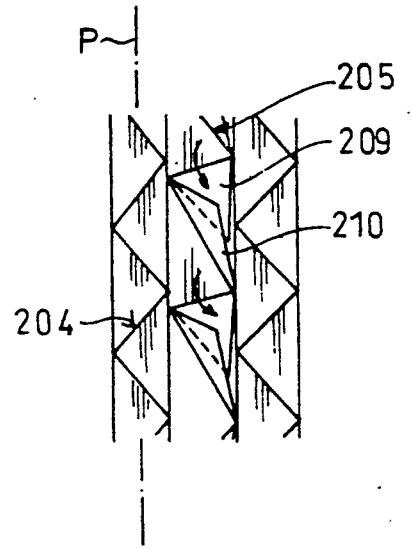
FIG. 20 is an end view of this lamellar sheet and two adjacent lamellar sheets.

Instead of deforming the lower edge of the lamellar sheets by cutting-folding as in FIGS. 19 and 20, it is possible to proceed by way of asymmetrical shearing of an undulated sheet 213, with tool 214 illustrated in FIGS. 22 and 23.

The tool, or shear, 214 is symmetrical with respect to a vertical plane R which is perpendicular to the horizontal direction f of movement of the starting undulated sheet 213. It comprises:

two lower fixed knives 215 in which the upper edge 216 is rectilinear, horizontal and parallel to plane R. The faces 217 opposite the two knives 215 diverge slightly from one another downwardly, and the edges 216 are outwardly bordered by means of two horizontal faces 218 on which the sheet 213 slides;

two vertically movable upper press-bands 219 having a lower edge 220 which is also rectilinear, horizontal and parallel to plane R. Each edge 220 is located immediately above corresponding edge 216 and is exteriorly bordered by face 221 which is inclined at about 30° to 60° with respect to the vertical, and extends into a horizontal face 222. Each press-band has a face 224 opposite the other press-band, which is parallel to plane R; and a double upper knife 225 which is guided with vertical sliding motion between faces 224. Its lower end, as seen perpendicularly to direction f (FIGS. 22 and 23), has an inverted V shape, which defines two cutting edges 226 adjacent faces 224. Each edge 226, on the other hand, as seen in direction f, has a very widened inverted V shape.

In operation, the press-bands 219 and knife 225 being in upper position (FIG. 22), band 213 moves forward, to rest on knives 215, until a predetermined length of band extends in the downstream direction (considering arrow f) beyond the downstream edge 216.

The press-bands 219 are then moved in a downward direction, which produces a double pinching of the band 213 between each edge 220 and the opposite edge 216, and produces a downward pulling of the metal of the two transverse zones of the sheet adjacent to these edges, according to the shape of faces 221, as illustrated in FIG. 23.

Then, knife 25 is moved in downward direction, to cut a chute 227 (FIG. 23) between the two lower knives 215 and detaches a lamellar sheet of predetermined length at the downstream side.

There is thus obtained, on each cut up edge, the configuration of FIG. 24, where zones 228 in the form of isoceles triangles are produced at the end of each wave, the peaks of the zones being at the wave peak 206 and the bases in the opposite limit plane S of the lamellar sheet, being in the extension of one another.

It will be understood that the zones 228 thus formed at the low edge of the lamellar sheets ensure an effect of deflection of the liquid similar to that produced by tongues 209, 210 of FIGS. 19 and 20.

It will be observed that in view of the symmetry of the shear, the front edge of band 213 which is not yet cut to length has a similar, not to say, identical configuration to the rear edge of the lamellar sheet which has just been detached. Following this, each lamellar sheet has similar high and low edges, as illustrated in FIG. 25. This is advantageous on the point of view of the manufacture and assembly of the lamellar sheets, and also because the space which is available within the circle C is thereby more completely filled.

In practice, because of the stiffness of the undulated metal and the presence of orifices with which the lamellar sheets are normally provided, the drawing of the material is not completely regular, and the zones 228 are not completely triangular but may present differences of various degree of importance with respect to this shape as well as the localized tears. FIG. 24, should therefore be considered as a theoretical diagram. Moreover, crushing caused by the shear gives rise to a small flattened band 229 (FIG. 24) along the sheared edge.

Figure 26:
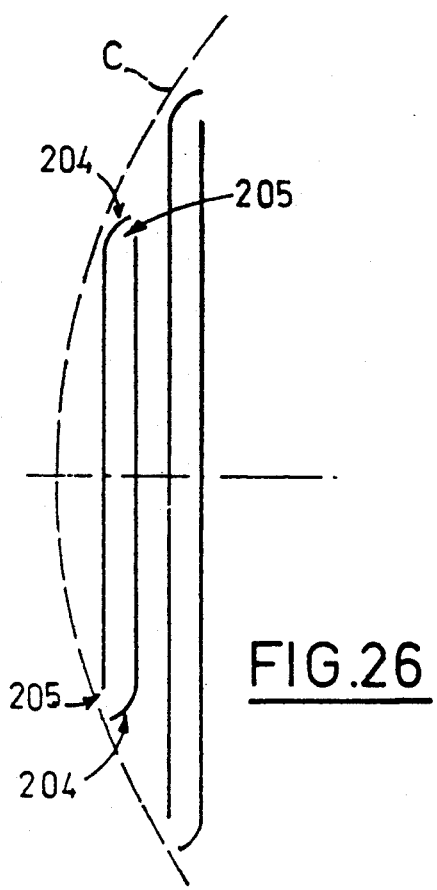
FIG. 26 is a view similar to FIG. 25 of another cross-undulating lining which may be used in the plant according to the invention.

FIG. 26 represents another embodiment of the lining in which the high edge 204 of each lamellar sheet is deformed to a point opposite the end slice of the low edge 205 of an adjacent lamellar sheet, which enables the latter to catch the liquid which has reached this low edge and to send it back towards the median zone of the lamellar sheets. In the example illustrated, the lamellar sheets are matched: the high edge of each lamellar sheet of each pair is opposite the end slice of the low edge of the other lamellar sheet of the same pair.

Figure 27:
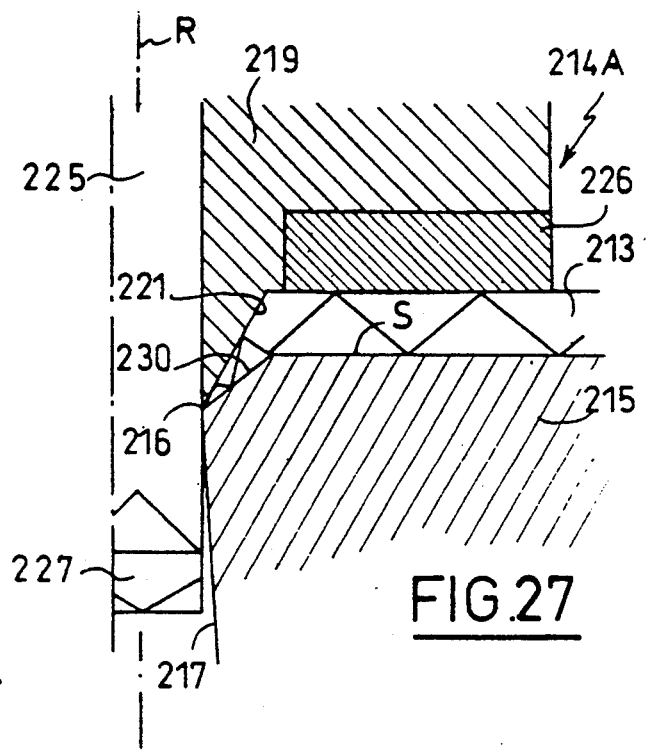
FIG. 27 illustrates similarly as FIG. 23 the production of the lining of FIG. 26.

To obtain such a deformation of the lamellar sheets, one may use the modified shear 214A schematically illustrated in FIG. 27: the upper face of a fixed knife 215 ends with a cut face 230, which is inclined at about 30° with respect to the horizontal, whose lower edge defines sharp edge 216, and wherein the face 221 of the associated upper knife 219 downwardly extends in a corresponding manner. Following this, the pinching of sheet 213 distorts its front edge to a point past the limit plane S, which is the upper plane of knife 215.

It should be noted that in this embodiment, the lower edge of each lamellar sheet is shaped differently than its upper edge. A non-symmetrical shear must therefore be used, in which the portion located on the other side of the plane R is for example such as illustrated in FIG. 22 to give a low edge as illustrated in FIG. 24, or as illustrated in FR-A-2 630 819, which gives a symmetrically shaped low edge thereby also reducing the partition effect, or a cutting tool without crushing.

Figure 28:
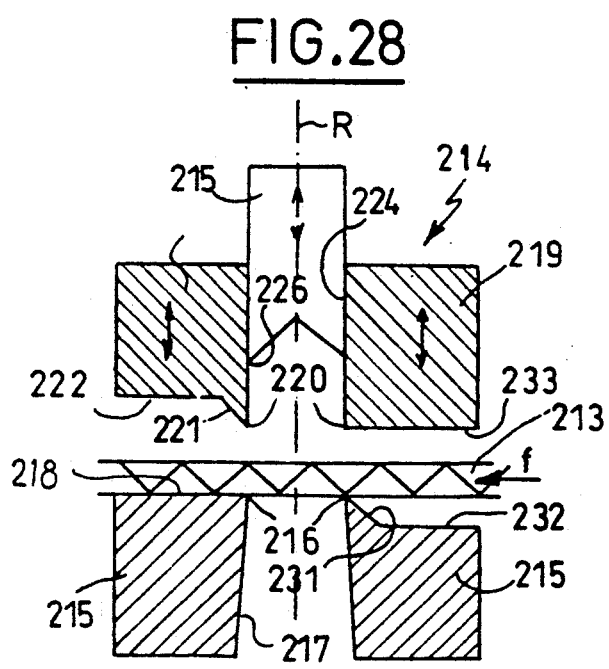
FIG. 28 is a view similar to FIG. 22 of a variant of instrument.

The tool illustrated in FIG. 28 differs from that of FIG. 22 in the following aspects:

upstream knife 215 presents, from its sharp edge 216, a downward face 231 which is inclined at 30° to 60° with respect to the horiozntal, followed by a horizontal face 232; and in the upstream press-band 219, faces 221 and 222 of FIG. 22 are replaced by a single horizontal face 233 which ends into sharp edge 220.

It will be understood that such an asymmetrical shear produces lamellar sheets in which the rear edge is such as illustrated in FIG. 24 but where the front edge is similarly deformed except in the other direction, i.e. it comprises a narrow band 229 in the other limiting plane of the lamellar sheet.

Figure 29:
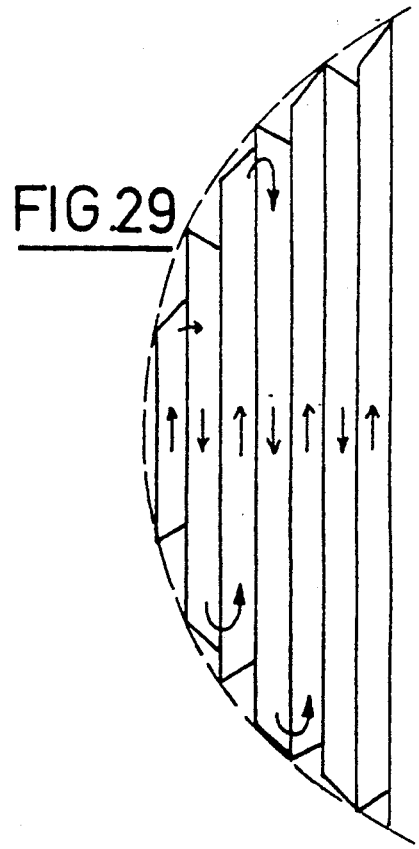
FIG. 29 is a plan partial view of the cross-undulating garnishing obtained by means of this instrument.

All the lamellar sheets of the pack are thus obtained with a single tool, which pack has the shape illustrated in FIG. 29. This is also true in the case of FIGS. 26 and 27, while in the examples of FIGS. 22 to 25, two identical tools are required, each producing one lamellar sheet out of two.

FR-A-2 630 819 mentioned above describes various characteristics of the linings and their assembly, enabling to reduce the partition effect, which may be used in the plant described above. As a variant or a supplement, as illustrated in FIG. 30, the base of the sections of lining may be truncated and downwardly convergent.

Distributor 29G illustrated in FIGS. 31 to 34 is another type of distributor adapted to be sandwiched between two lining packs, and more particularly between a lower pack of relatively large diameter and an upper pack of relatively small diameter. It has been illustrated instead of distributor 29A of FIG. 10, where the lower pack 24 is directly surrounded by sleeve 61 of the column.

This distributor 29G consists of two superposed levels:

A lower level 267, spaced from the lower pack 24 by means of braces 84, which consists of a peripheral corner member 268 (not illustrated in FIG. 31) fixedly mounted on sleeve 61 by means of supports 269, and a series of U shaped members 270 which are parallel to one another, in which each has a perforated bottom 271 and two vertical wings each ending into a horizontal flange 272. The shaped members are kept in position by means of sealing end braces 270A.

An upper level 273 of the same construction as distributor 29 of FIGS. 2 to 4, except for the following differences:

on the one hand, the bottoms 38 of the liquid spaces 49 are not perforated; on the other hand, at half length of each bottom 38 (or, as a variant, at regular distances), a tube 274 is downwardly directed. Plates 47 completely closes the ends of the gas spaces 46.

Figure 32:
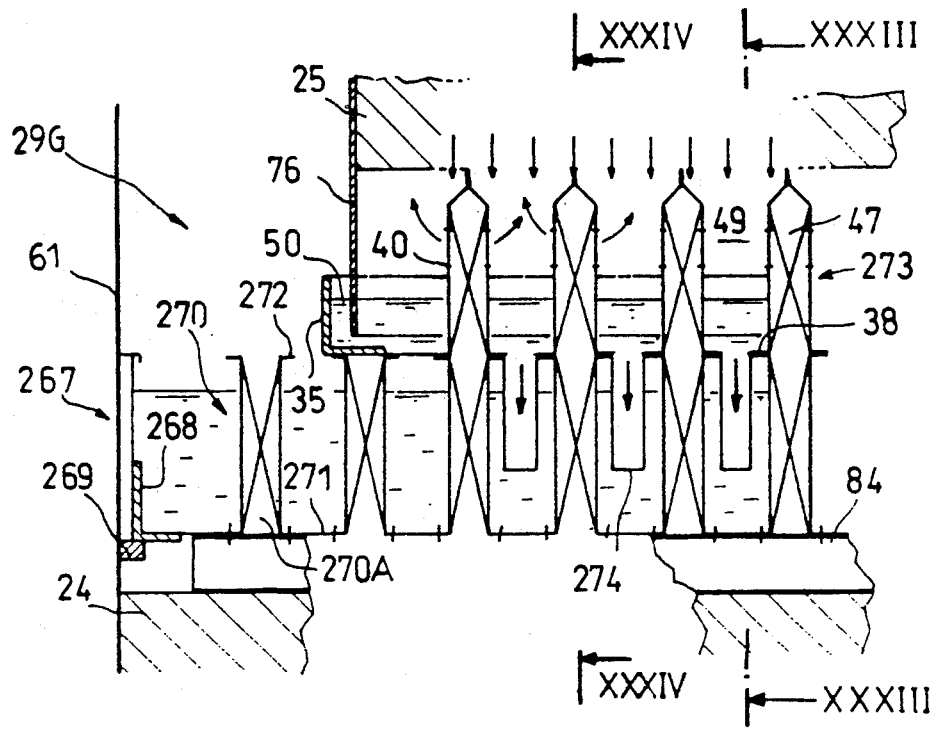
FIG. 32 is a view of the distributor of FIG. 31 in transverse cross-section along line XXXII—XXXII of this FIG. 31.
Figures 33, 34:
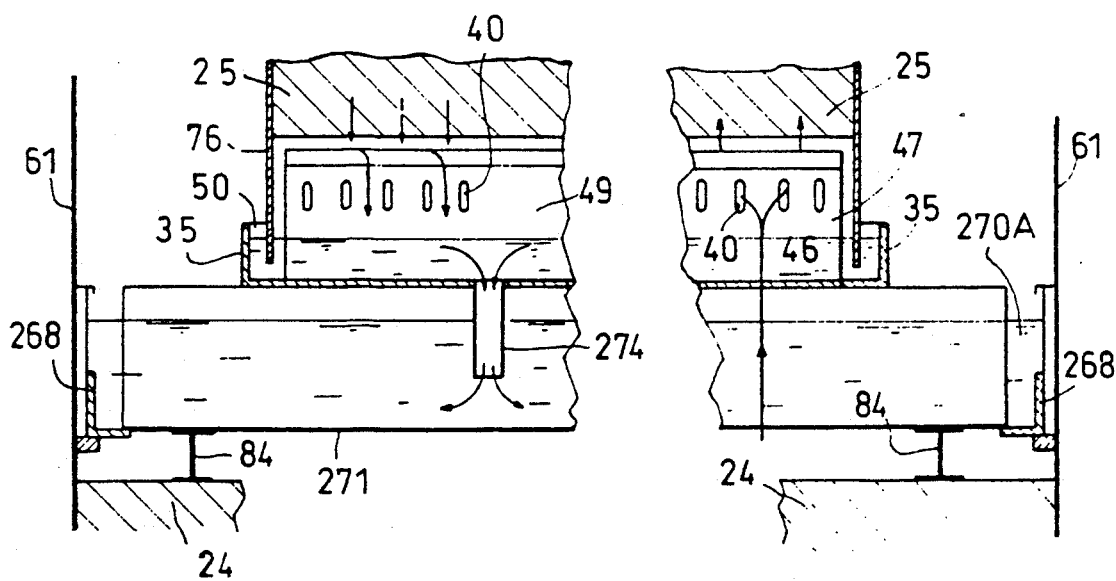
FIGS. 33 and 34 are partial views taken in cross-section respectively along lines XXXIII—XXXIII— and XXXIV—XXXIV— of FIG. 32.
Figure 35:
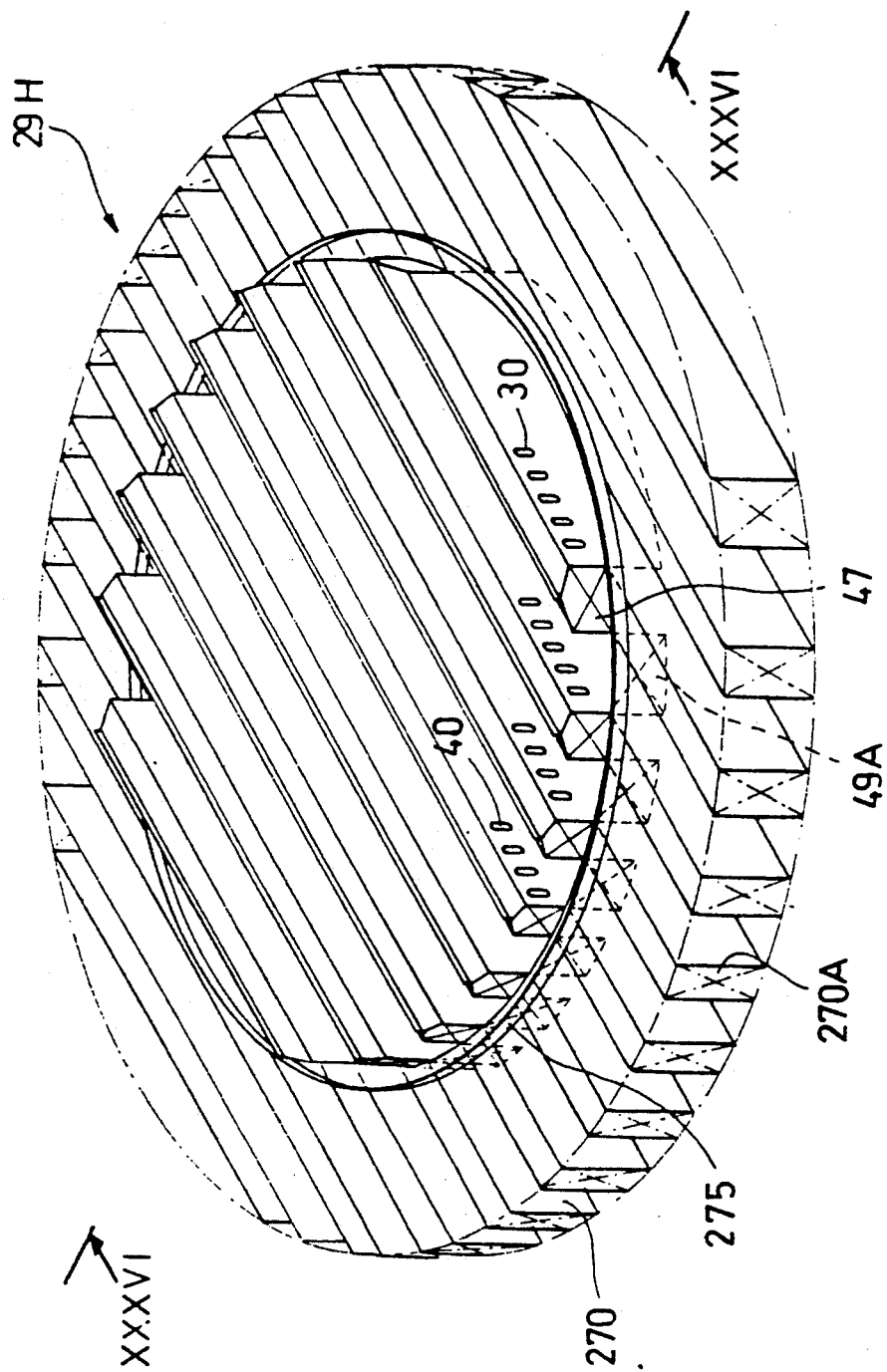
FIG. 35 is a view similar to FIG. 31 of another variant of distributor.

As seen in FIG. 32, level 273 is arranged so that each liquid space 49 is superposed over a shaped member 270 and rests on two flanges 272, so that tubes 274 may penetrate into these shaped members. Sleeve 76 of the upper pack 25 extends downwardly and penetrates into the peripheral channel 50 of level 273.

In operation, (FIGS. 32 to 34), the liquid which falls from the upper pack 25 is collected in spaces 49 of level 273 and goes down into the shaped members 270 via tubes 274, and, from there, it is distributed through the orifices of the shaped member over the entire surface of the lower pack 24. By passing through the distributor, the composition of the descending liquid is thereby homogenized. It should be noted that all the shaped members 270 communicate with one another through their ends, so that a peripheral trough filled with liquid is provided around level 267.

Simultaneously, a portion of the ascending gas issued from the pack 24 circulates between the shaped members 270 and reaches the gas spaces 46 of level 273, after which it is distributed as described above, via orifices 40, in pack 25.

The remaining ascending gas circulates freely between shaped members 270, to reach the annular space between sleeves 61 and 76. The distributor therefore operates with high flexibility, which enables to withdraw largely variable quantities of gas in said annular space without disturbing the good distribution of the fluids in the two packs.

As indicated in FIG. 32, the braces 84 are arranged perpendicularly to the shaped members 270.

FIGS. 35 to 38 represent another two stage distributor 29H having substantially the same advantages as distributor 29G. This distributor 29H is obtained from that of FIG. 2, in the following manner.

Figure 36:
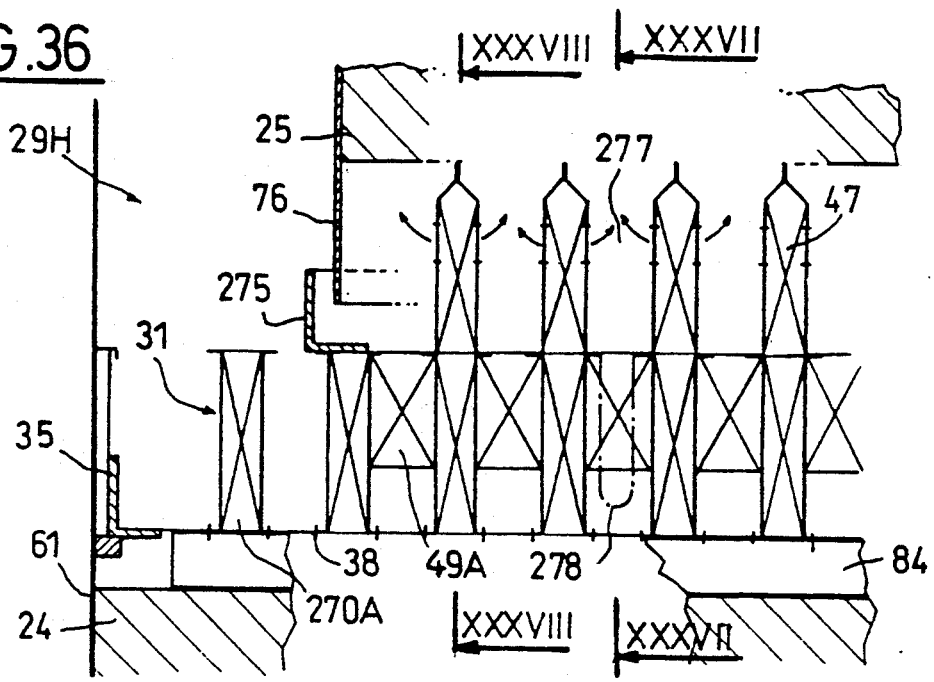
FIG. 36 is a view of the distributor of FIG. 35 in transverse cross-section along line XXXVI—XXXVI of this FIG. 35.

Corner 35 has the same diameter as sleeve 61, and the upper portion of the shaped members 31 is removed from their ends until about reaching a circle whose diameter corresponds to that of the upper pack 25, and this is carried out up to a level located below orifices 40. A corner member 275 is disposed around the central projecting portion of the shaped members 31, and sleeve 76 again penetrates into the peripheral channel thus produced. Plates 47 of FIG. 2 are divided into upper 47 and lower 270A plates similar to those of FIGS. 31 to 34. Moreover, other vertical plates 49A close the width of the ends of spaces 49, are fixed by means of their upper edge to the corner member 275 and extend downwardly a small distance from the bottoms 38 (FIGS. 36 and 37).

In operation, (FIGS. 36 to 38), the descending liquid is combined on bottoms 38, where the spaces 49 communicate with one another, as previously, by means of their ends, and this liquid is distributed from there onto the lower pack 24. The ascending gas circulates in part through spaces 46, and from there in the upper pack 25 through openings 40, the remaining gas freely reaching the annular space provided between the two sleeves 61 and 76. The lower parts of the plates 49A define a liquid seal between the central zone and the peripheral zone of the distributor.

Figure 37:
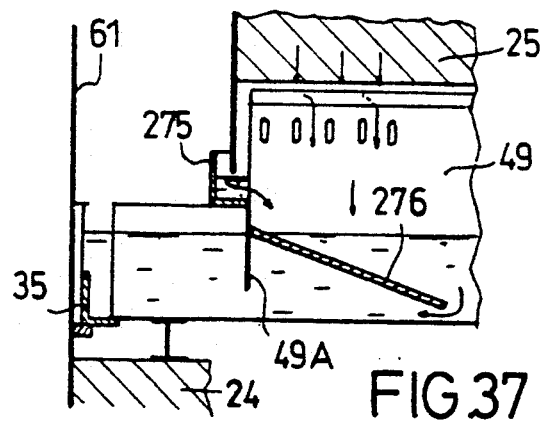
FIGS. 37 and 38 are partial views taken in cross-section respectively along lines XXXVII—XXXVII and XXXVIII—XXXVIII of FIG. 36.
Figure 38:
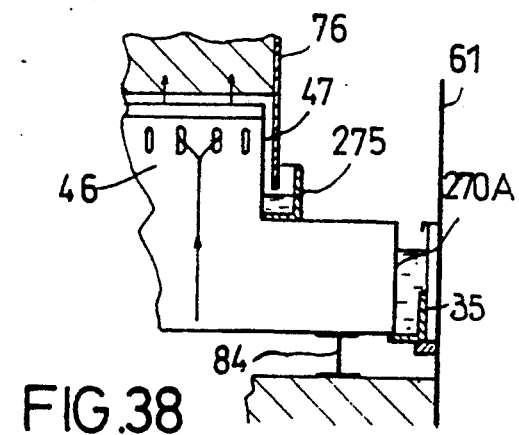

As indicated in FIG. 37, inclined plates 276 originating from the plates 49A may be provided in each shaped member 31, in order to make sure, as previously, that the descending liquid is homogenized when passing through the distributor.

Figure 39:
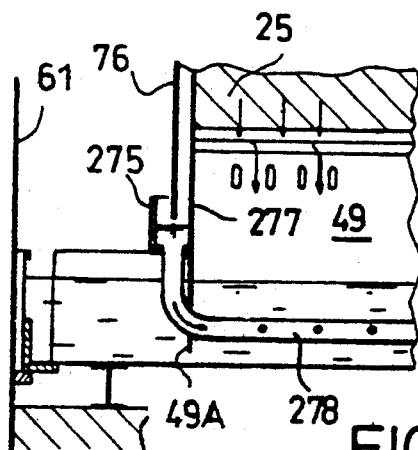
FIGS. 39 and 40 are views similar to FIGS. 37 and 38, respectively, of a modification.
Figure 40:
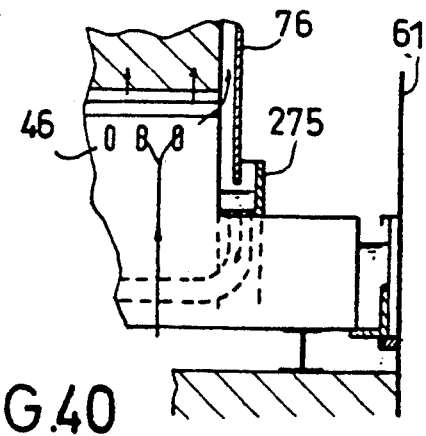

FIGS. 39 and 40 show another way of homogenizing the descending liquid, when the latter passes through the distributor: the liquid spaces 49 of the upper level of the distributor are closed at both ends by means of a plate 277 which constitutes an upward extension of the plate 49A, and a tube 278 in the general shape of a U connects two points of the peripheral channel of the upper level which are located past the two corresponding plates 277. This tube is perforated in its median portion, so that the descending liquid is brought from the periphery of the pack 24 towards the middle of spaces 49. A plate 277 and a tube 278 have been illustrated in mixed line in FIG. 36.

Conversely, when the sandwich distributor is between an upper section of relatively large diameter and a lower section of relatively small diameter, as it is the case for distributors 29B and 29C, the bottoms 38 are perforated only in the zone which hangs over the lower section.

Figure 41:
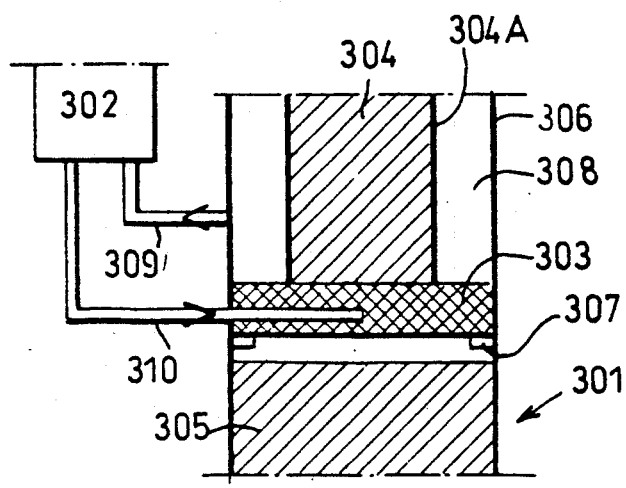
FIG. 41 is a schematic partial view, in axial cross-section, of another distillation column according to the invention.

A portion of a plant for air distillation with double column and production of argon, namely the area where the low pressure column 301 of the double column connects with the column 302 for the production of impure argon is illustrated in FIG. 41. In this area of column 301, a combined distributor 303 is sandwiched between an upper distillation section 304 of relatively small diameter and a lower distillation section 305 of relatively large diameter which, in the illustrated example, is equal to the inner diameter of the main sleeve 306 of column 301. Distributor 303 is placed on supports 307 which are fixedly mounted in sleeve 306, and a free space of small height remains between this distributor and the top section 305. As a variant, braces consisting of I or flat irons may be disposed between the top of section 305 and the distributor 303, in which case the latter would ensure the counter-support of section 305.

Section 304 is surrounded by an auxiliary sleeve 304A, which is concentric to sleeve 306, and which defines with the latter an annular space 308 above distributor 303. A duct for bleeding argon 309 leaves space 308 and opens in the lower part of column 302, and a liquid return duct 310 leaves the bottom of the latter and opens in the central area of the distributor 303, as will be described in detail hereinafter with references to FIGS. 42 to 51.

In all the embodiments illustrated in FIGS. 41 to 51, distributor 303 is the same as described in Patent Application FR-A-2 655 877 mentioned above. It essentially comprised a series of parallel shaped members 311 of U-shaped cross-section in which each includes a flat bottom 312 which is perforated with two rows of openings 313 and is provided with two vertical wings 314. Each wing ends at the top in an outwardly inclined portion 315 and has, immediately below the latter, a row of openings 316, which are oblong with a long vertical axis. The terminal portions of parts 315 of the adjacently disposed shaped members are fixed to one another, and the terminal portions of bottoms 312 as well as the edges of the terminal bottoms 312 are fixedly mounted on a peripheral corner member 317 from which a cylindrical skirt 318 rises.

Figure 42:
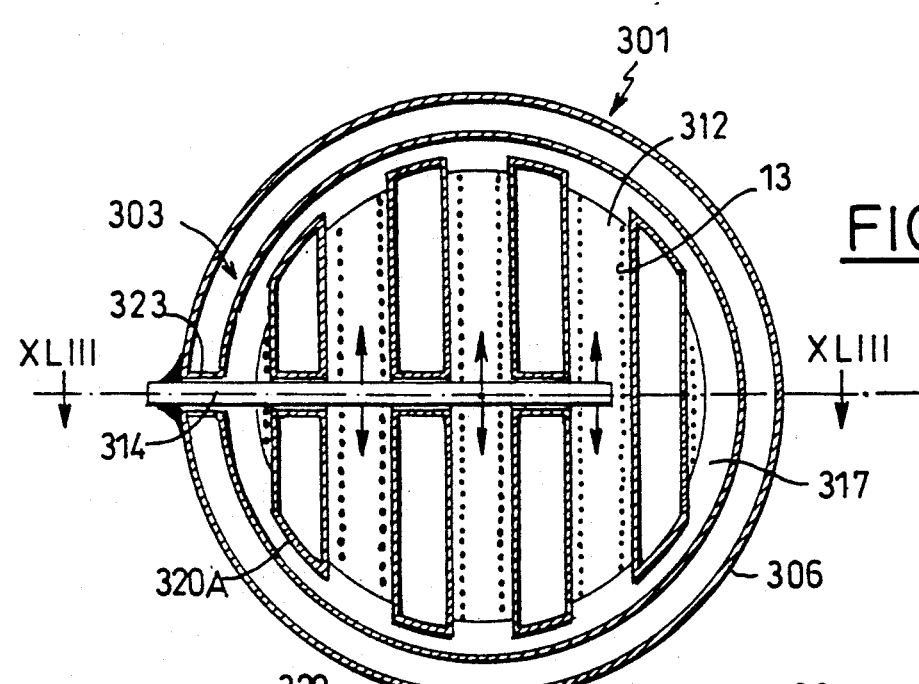
Figure 43:
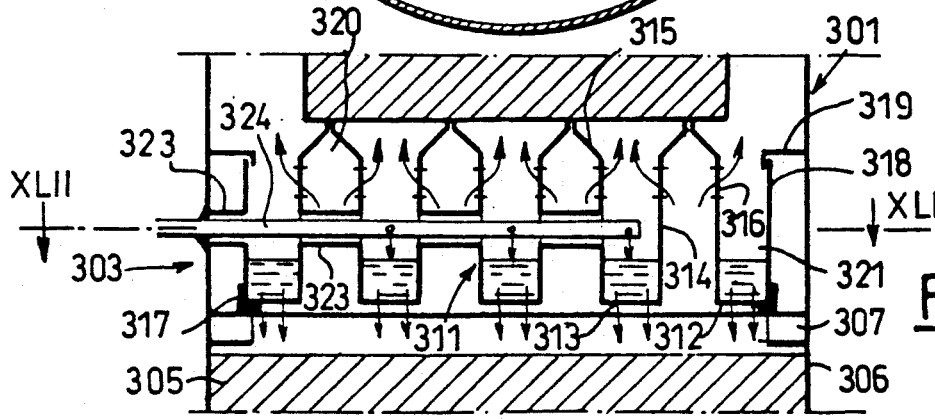

In the example of FIGS. 42 and 43, corner member 317 is directly placed on supports 307. Moreover, a peripheral flange 319 which is unitary with sleeve 306 covers the upper end of skirt 318.

There are thus provided, under the oblique portions 315, gas spaces 320 which are downwardly opened, and, above bottoms 312, liquid spaces 321, which are upwardly opened and whose terminal portions open in a same peripheral channel 322 defined by corner member 317 and skirt 318. The spaces 320 are closed at their ends, at least up to the level of the liquid in spaces 321, by means of plates 320A.

A casing 323, which has a horizontal axis and is perpendicular to the shaped members 311 sealingly connects sleeve 306 to skirt 318 according to a diameter of the column. Below openings 316, the wings 314 of a certain number of shaped members 311 are provided with a row of openings which are aligned with the casing 323 and are sealingly connected, in gas spaces 320, by means of other similar casings.

To feed distributor 303, a tube 324 welded to sleeve 306, extends through all the casings 323, and has perforations opposite the liquid spaces 321 which are located in the central area of the distributor. This tube 324 is connected to the duct 310 of FIG. 41.

Thus, in operation, the argon impoverished liquid which is sent back from column 302 to column 301 is poured into the central area of the distributor, is mixed with the liquid which is richer in argon which falls from the upper section 304 into the spaces 321 and flushes this richer liquid, to some extent, towards the periphery of the column. It has been observed that this phenomenon substantially improves the performances of distillation in the lower area of the low pressure column 301.

FIGS. 44 to 46 show another way of bringing the liquid to the central area of the distributor. In this case, the lower section 305 is also enclosed by an auxiliary sleeve 325, and an annular sealing device 326 connects the upper portion of the latter to the main sleeve 306. The distributor has no peripheral skirt, so that all its liquid spaces 321 directly communicate with the peripheral trough 327 bound by the two sleeves and sealing device 326.

Liquid return duct 310 opens into an arcuately shaped collector 328 placed in trough 327, and a series of tubes 324 leave from this collector and longitudinally penetrates into each of the liquid spaces 321, below the level of the liquid in the latter. All the tubes 324 end at about mid-length of the spaces 321, by means of a pouring orifice 329. There are thus obtained favorable results which are similar to those described above.

Figure 47:
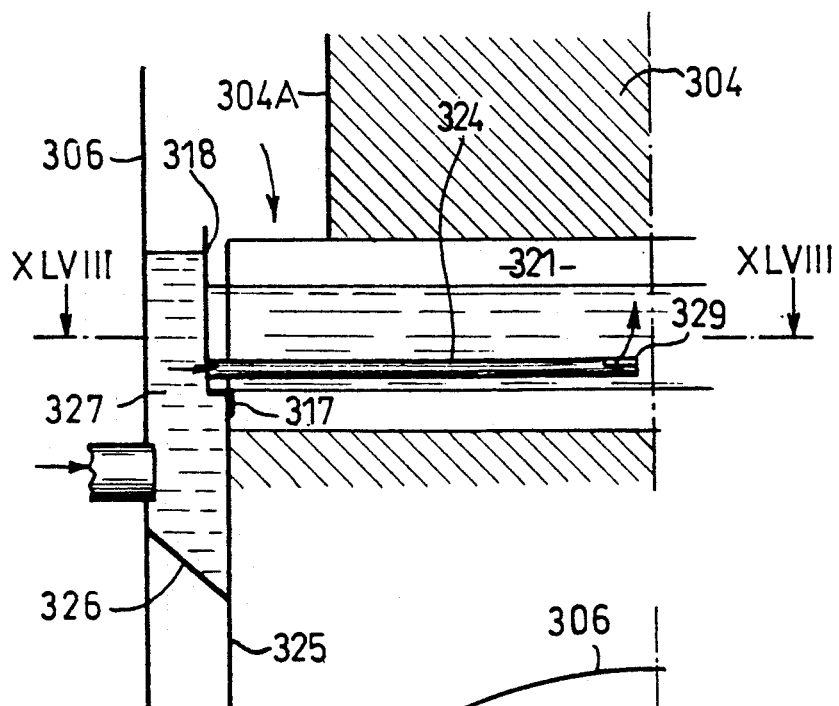
Figure 48:
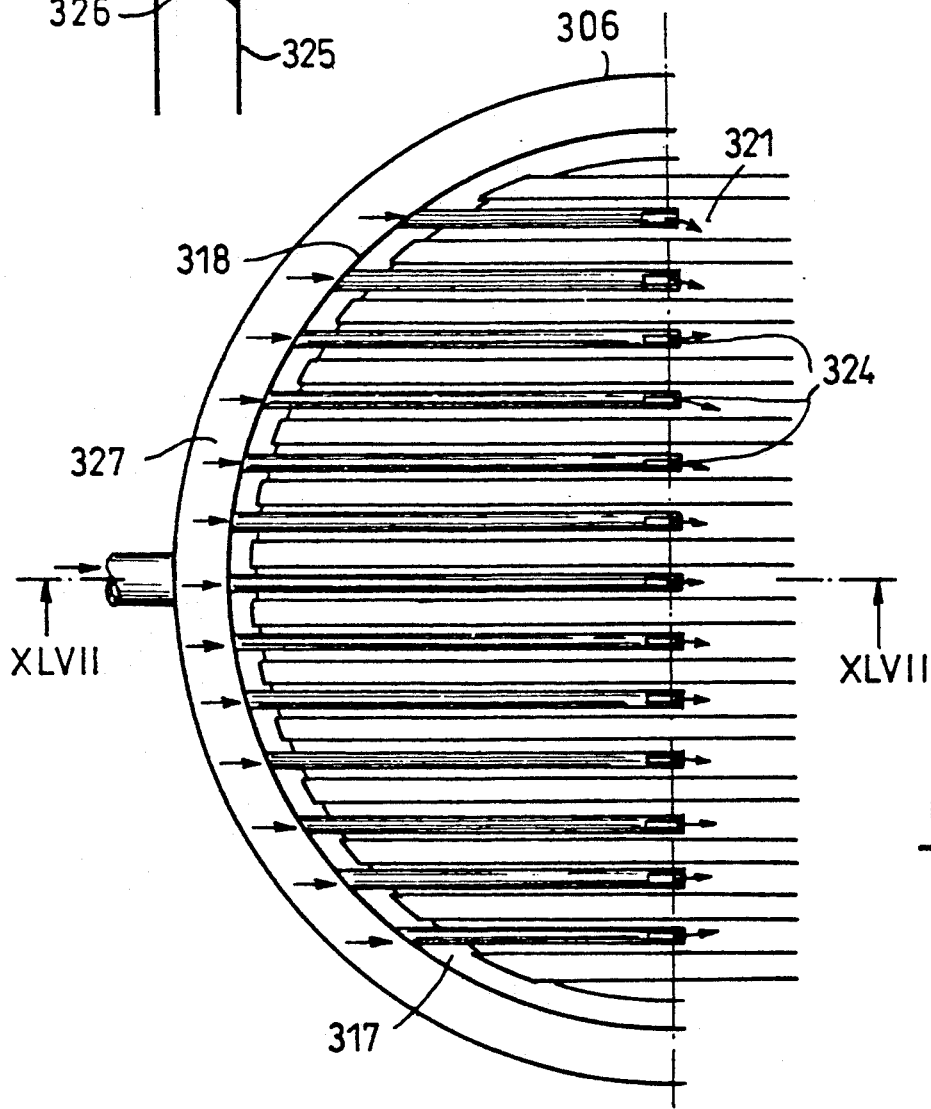

The embodiment of FIGS. 47 and 48 differs from the previous one only by the fact that the trough 327 is used as a feeding collector. Distributor 303 includes peripheral skirt 318, and tubes 324 have their exterior end welded to this skirt. In this case, in operation, the level of liquid is established in trough 327, as a function of the pressure which is required for the liquid to flow outside tubes 324.

In the embodiment of FIGS. 49 and 50, there is a series of tubes 324 which are parallel to the shaped members 311 of the distributor, the latter including a peripheral skirt 318. However, as in FIGS. 42 and 43, the diameter of the lower section 305 is equal to the inner diameter of the sleeve 306. The arcuate feeding collector 328 is disposed outside sleeve 306; tubes 324 sealingly extend through the sleeve 306, to which they are fixed by means of welding points, and they freely pass through skirt 318. For this reason, tubes 324 are above the level of the liquid in the distributor.

As illustrated, collector 328 may be below tubes 324 (FIGS. 49 and 50), or as a variant, in loading position, above these tubes (FIG. 51).

We claim:

1. Air distillation column, including stackings of packs of structured cross-undulated packing on at least part of the height thereof, each pack comprising a bundle of rectangular undulated lamellar sheets each placed in a generally vertical plane, and against one another, waves of each lamellar sheet being oblique and downwardly directed, in opposite directions from one lamellar sheet to the next one, from a high vertical edge to a low vertical edge of the lamellar sheet, wherein the packs of packing include means for reducing HETP (height equivalent to a theoretical plate) which comprises, in at least one area of each pack, the following two characteristics:

(a) an asymmetrical lateral deformation of said low edge and/or, in a median portion of the packing where cord of the packing has little variation, a contraction of the low edge of each lamellar sheet with respect to the upper edge of the two adjacent lamellar sheets; and (b) a sealing device around said pack and between the latter and a sleeve surrounding same, said sealing device comprising on the one hand a girdle applied against periphery of the pack and including a series of teeth inclined towards the axis of the sleeve along the lower edge thereof, and on the other hand, means sealingly connecting the girdle to the inner wall of the sleeve.

2. Column according to claim 1, wherein consecutive distillation sections, defined between a lower fluid inlet/outlet unit, and an upper fluid inlet/outlet unit, are separated in pairs by means of a combined distributor, said distributor enabling collection of fluids from each section and their redistribution to the other section, support of the upper section and possibly counter-support of the lower section.

3. Column according to claim 2, wherein the combined distributor is sandwiched between the two distillations sections.

4. Column according to claim 2, wherein the combined distributor comprises a series of parallel shaped members placed side by side to define alternate spaces of gas and liquid, each shaped element having a general U-shaped cross-section and including at least a portion of lower horizontal wall provided with a row of holes and substantially vertical wings each including an outwardly directed terminal portion and connecting with a terminal portion of the wing of an adjacent shaped member to define one of the gas spaces, a row of openings formed in the upper part of the wing, the shaped members being fixedly mounted by means of the ends of their bottom portions to a peripheral annular ring defining a peripheral channel which is in communication with all liquid spaces.

5. Column according to claim 2, wherein the combined distributor comprises:
a lower level of large diameter, comprising an outer annular ring carrying a series of bottom perforated parallel U-shaped members;
an upper level which comprises a series of adjacent parallel shaped members defining alternate spaces of liquid and gas, each shaped member generally having a U-shaped cross-section and including at least one horizontal lower wall portion and substantially vertical wings each including a terminal portion which is outwardly directed and connecting with a terminal portion of the wing of an adjacent shaped member to define one of the gas spaces, a row of openings being formed in the upper portion of the wing, and a secondary annular ring disposed around said upper level, the sleeve of the upper section downwardly extending and fitting inside said secondary annular ring, the space surrounding said sleeve freely communicating with the space located under the distributor; and
means to cause the liquid to move down from said liquid spaces into the U-shaped members.

6. Column according to claim 5, wherein the distributor comprises homogenizing means to bring the downwardly moving liquid from the area of the sleeve of the upper section to an intermediate area of the lower part of the distributor.

7. Column according to claim 6, wherein the homogenizing means comprise vertical down-feeding tubes or inclined plates, or tubes of U-shaped members perforated in median area thereof.

8. Column according to claim 1, wherein at least one distillation section provided between lower fluid inlet/outlet unit and an upper fluid inlet/outlet unit, consists of a single continuous packing section between these two inlet/outlet units, for a number of theoretical plates up to 25 and a section diameter between about 1 and 6 m.

9. Column according to claim 1, constituting a mean pressure column or a column for the production of impure argon, coupled to the low pressure column, which consists of a single continuous packing section between a fluid inlet/outlet unit provided at the bottom of the column and a fluid inlet/outlet unit provided at the top of the same column.

10. Column according to claim 1, constituting the low pressure column of a plant including a column for the production of impure argon, wherein its section for the separation of oxygen and argon consists of a single continuous packing section between on the one hand a lower fluid inlet/outler unit comprising means for withdrawing oxygen, and on the other hand, an upper fluid inlet/outlet unit comprising means for withdrawing gas feeding into the column for the production of impure argon and for the re-injection of the liquid from the bottom portion of this column.

11. Column according to claim 1, constituting the low pressure column of a double column plant, wherein at least one distillation section of the column is surrounded by an auxiliary sleeve around which there is provided an annular space in which fluid inlet/outlet means arrive.

12. Column according to claim 1, wherein said teeth are adjacent one another all around the sealing device and have for example a triangular shape with sharp tip.

13. Plant according to claim 12, wherein said girdle includes vertical cuts on both sides of each tooth, to define a corresponding number of flexible tongues.

14. Column according to claim 1, wherein the lower portion of at least one distillation section has a downwardly convergent truncated shape.

15. Column according to claim 1, having a mean HEPT at most equal to 45 cm on at least a portion of its height, said mean HEPT depending on the height of the distribution means and that of the packing support means.

16. Column according to claim 1, which comprises:
a main sleeve;
a first distillation section, or upper section, including packing, bound by an auxiliary sleeve disposed in the main sleeve, the two sleeves defining therebetween an annular space;
gas outlet means adapted for withdrawing gas from said annular space;

a second distillation, or lower section, including packing, of larger diameter than the first section and disposed underneath the latter;

a combined distributor for collecting liquid falling from the upper section and re-distribution thereof in the lower section, collecting the gas from the lower section and re-distribution thereof in the upper section and in the annular space, support of the upper section and possibly counter-support of the lower section; and liquid inlet means in the column, said means adapted for introducing liquid essentially into the central area of the distributor, so as to send liquid already present in this central area towards the periphery of the distributor.

17. Column according to claim 16, wherein the liquid inlet means comprise at least one tube which perpendicularly passes through at least some of the wings and which has perforations opposite the liquid spaces located in said central region.

18. Column according to claim 16, wherein the liquid inlet means comprise at least one tube which longitudinally extends in a liquid space of the distributor and opens about mid length of the latter.

19. Column according to claim 18, wherein the liquid inlet means comprise a series of parallel tubes, each longitudinally extending in a liquid space of the distributor to open substantially at mid height of the latter, the upstream ends of these tubes being connected together by means of an arcuately shaped sealing collector.

20. Column according to claim 19, wherein the collector is mounted in the main sleeve.

21. Column according to claim 20, wherein the tubes sealingly extend through a peripheral skirt defining peripheral channel of the distributor.

22. Column according to claim 20, wherein the collector is an elbow tube mounted in said annular space or in an annular space provided around the distributor or the lower distillation section.

23. Column according to claim 20, wherein the collector is laterally defined by the main sleeve, an auxiliary sleeve of the lower distillation section and a peripheral skirt bounding the peripheral channel of the latter, and comprises at the lower part thereof a sealing device which connects the auxiliary sleeve of the lower section to the main sleeve.

24. Column according to claim 19, wherein the collector is mounted outside the main sleeve and the tubes sealingly extend therethrough and freely through a peripheral skirt bounding the peripheral channel of the distributor, above the level of liquid in the liquid spaces of the distributor.

25. Column according to claim 16, wherein the column is a low pressure column of a double column for the distillation of air, and said means defining a gas inlet and a liquid outlet comprise ducts connecting said low pressure column to a column for the production of impure argon associated therewith.

26. Column for the distillation of air, constituting a mean pressure column or a column for the production of impure argon, combined with the low pressure column of a plant for the distillation of air with a double column, which comprises a single continuous packing section between a fluid inlet/outlet unit provided at the bottom portion of the column and a fluid inlet/outlet unit provided at the top of said column, said packing section comprising a stacking of structured packing of the cross-undulated type, each pack comprising a bundle of rectangular undulated lamellar sheets each disposed in a vertical plane and against one another, waves of each lamellar sheet being downwardly oblique, in opposite directions from one lamellar sheet to the next one, from one high vertical edge to a low vertical edge of the lamellar sheet.

27. Column for the distillation of air, constituting the low pressure column of a plant for the distillation of air with a double column and a column for the production of impure argon, wherein the section for the separation of oxygen and argon consists of a single continuous packing section, on the one hand between a lower fluid inlet/outlet unit comprising means for withdrawing oxygen, and on the other hand an upper fluid inlet/outlet unit comprising means for withdrawing gas and feeding same to the column for the production of argon and for re-injecting liquid at the bottom of this column, said packing section consisting of a stack of packs of structured packing of the cross-undulated type, each pack comprising a bundle of rectangular undulated lamellar sheets each disposed in a generally vertical plane and against one another, the waves of each lamellar sheet being downwardly oblique, in opposite directions from one lamellar sheet to the next one, from a high vertical edge to a low vertical edge of the lamellar sheet.

28. Distillation column, which comprises:

a main sleeve:

a first distillation section, or upper section, including packing, bound by an auxiliary sleeve disposed inside the main sleeve, the two sleeves defining therebetween an annular space;

gas outlet means adapted for withdrawing gas from said annular space;

a second distillation section, or lower section, including packing, of larger diameter than the first section and mounted underneath the latter;

a combined distributor for collecting liquid falling from the upper section and re-distributing same in the lower section, collecting gas from the lower section and re-distributing same in the upper section and in the annular space, supporting the upper section and possibly counter-supporting the lower section; and liquid inlet means into the column, said means adapted to introduce liquid essentially in the central area of the distributor, so as to displace towards the periphery of the distributor, liquid already present in this central region.

* * * * *